United States Patent
Iwashita et al.

(10) Patent No.: US 8,143,836 B2
(45) Date of Patent: Mar. 27, 2012

(54) MOTOR CONTROLLER

(75) Inventors: Yasusuke Iwashita, Yamanashi (JP);
Yuuichi Yamada, Yamanashi (JP);
Mamoru Yaeshima, Yamanashi (JP);
Masatomo Shirouzu, Yamanashi (JP);
Koujirou Sakai, Yamanashi (JP)

(73) Assignee: Fanuc Ltd, Minamitsuru-gun, Yamanshi (JP)

( * ) Notice: Subject to any disclaimer, the term of this patent is extended or adjusted under 35 U.S.C. 154(b) by 499 days.

(21) Appl. No.: 12/364,563

(22) Filed: Feb. 3, 2009

(65) Prior Publication Data

US 2009/0237016 A1 Sep. 24, 2009

(30) Foreign Application Priority Data

Mar. 21, 2008 (JP) ................................ 2008-073251

(51) Int. Cl.
*H02P 27/04* (2006.01)
*H02P 1/00* (2006.01)
*H02P 3/14* (2006.01)
*H02P 27/00* (2006.01)

(52) U.S. Cl. ........ 318/801; 318/139; 318/268; 318/376; 318/400.3; 318/800

(58) Field of Classification Search .................. 318/139, 318/268, 376, 400.3, 800, 801
See application file for complete search history.

(56) References Cited

U.S. PATENT DOCUMENTS

| | | | |
|---|---|---|---|
| 5,914,582 A * | 6/1999 | Takamoto et al. ............ 318/801 |
| 6,198,240 B1 * | 3/2001 | Notohara et al. ............ 318/268 |
| 6,636,011 B2 * | 10/2003 | Sadasivam et al. .......... 318/727 |
| 7,042,178 B2 * | 5/2006 | Yamada et al. ............... 318/376 |
| 7,227,323 B2 * | 6/2007 | Yamada et al. ............... 318/376 |
| 7,528,566 B2 * | 5/2009 | Song et al. .................... 318/632 |
| 7,868,569 B2 * | 1/2011 | Iwashita et al. .............. 318/376 |
| 7,893,637 B2 * | 2/2011 | Suhama et al. ............... 318/376 |
| 2007/0296357 A1 * | 12/2007 | Song et al. .................... 318/139 |
| 2008/0007190 A1 * | 1/2008 | Kunii et al. ................... 318/141 |
| 2008/0315813 A1 * | 12/2008 | Yamada et al. ............... 318/432 |
| 2009/0146612 A1 * | 6/2009 | Oyobe et al. ................. 320/138 |
| 2009/0243522 A1 * | 10/2009 | Suhama et al. ............... 318/376 |

FOREIGN PATENT DOCUMENTS

| | | |
|---|---|---|
| JP | 5-146092 | 6/1993 |
| JP | 7-7864 | 1/1995 |
| JP | 2000-141440 | 5/2000 |
| JP | 2002-338151 | 11/2002 |

OTHER PUBLICATIONS

Japanese Notice of Reasons for Rejection mailed Dec. 22, 2009 issued in Japanese Application No. 2008-073251 (including a partial translation thereof).

* cited by examiner

*Primary Examiner* — Walter Benson
*Assistant Examiner* — Gabriel Agared
(74) *Attorney, Agent, or Firm* — Drinker Biddle & Reath LLP

(57) ABSTRACT

A motor controller capable of effectively utilizing electrical energy accumulated in a capacitor and achieving a reduction in capacitance of the capacitor. The motor controller includes a converter that receives an input AC voltage and performs AC-to-DC power conversion thereon, an inverter that receives DC power and performs DC-to-AC conversion thereon, and a capacitor and a charging/discharging control circuit connected in parallel with a DC link between the converter and the inverter. Electrical energy is supplied from the capacitor to the DC link via the charging/discharging control circuit. The charging/discharging control circuit has a circuit for discharging electrical energy accumulated in the capacitor and for stepping up a voltage of the capacitor when discharging the electrical energy.

14 Claims, 25 Drawing Sheets

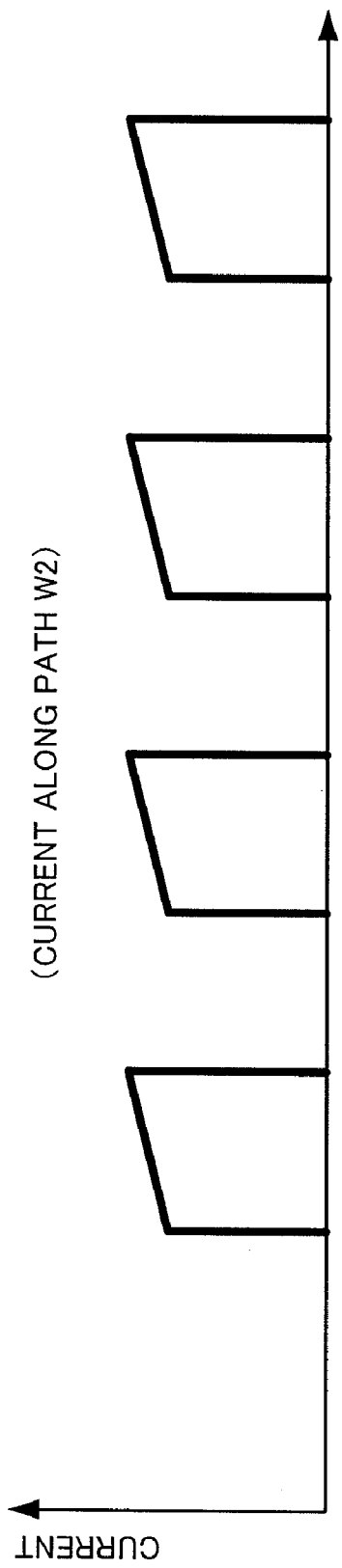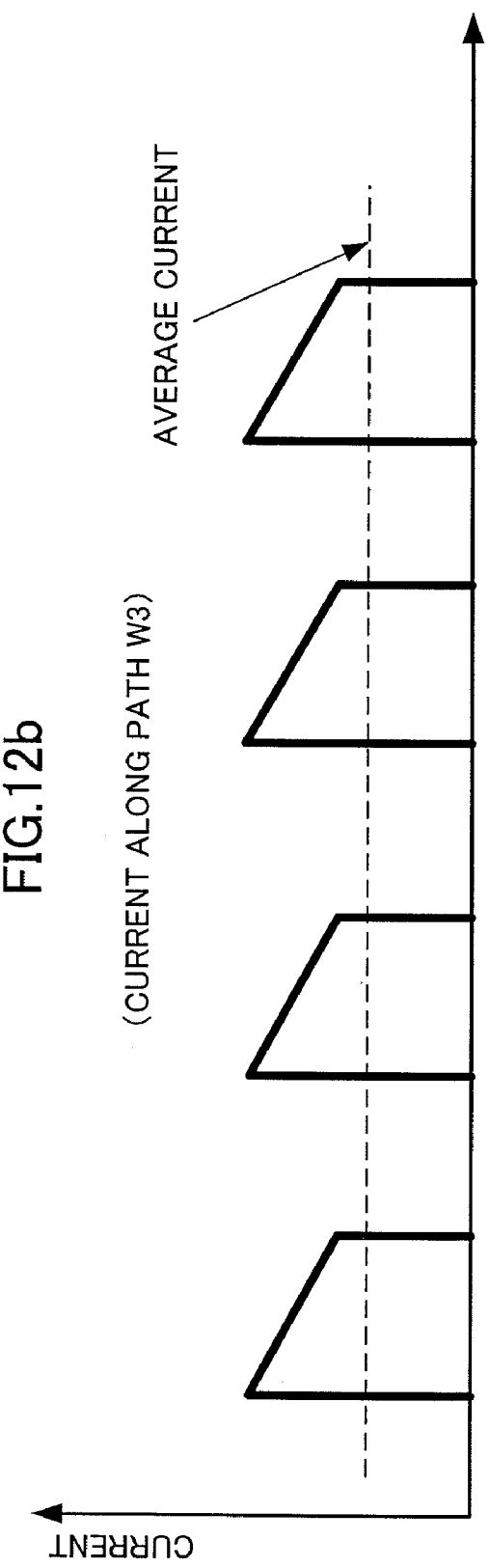

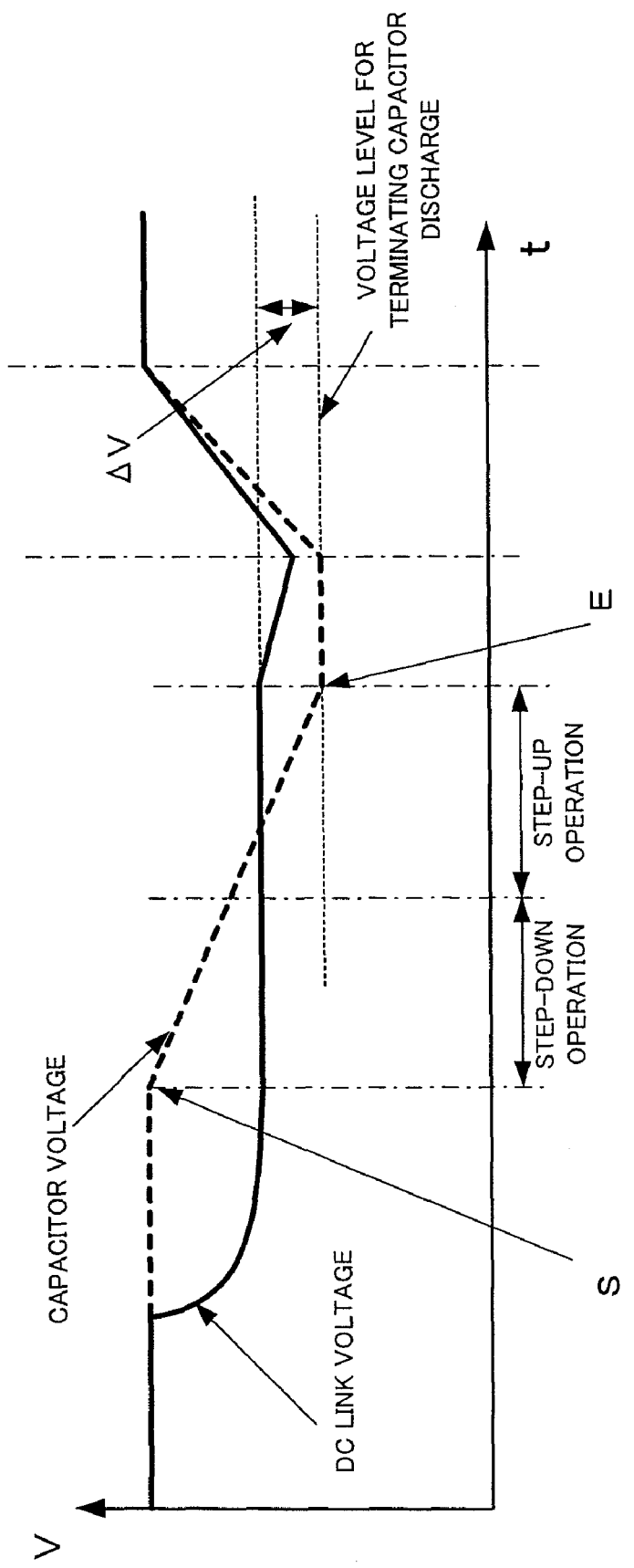

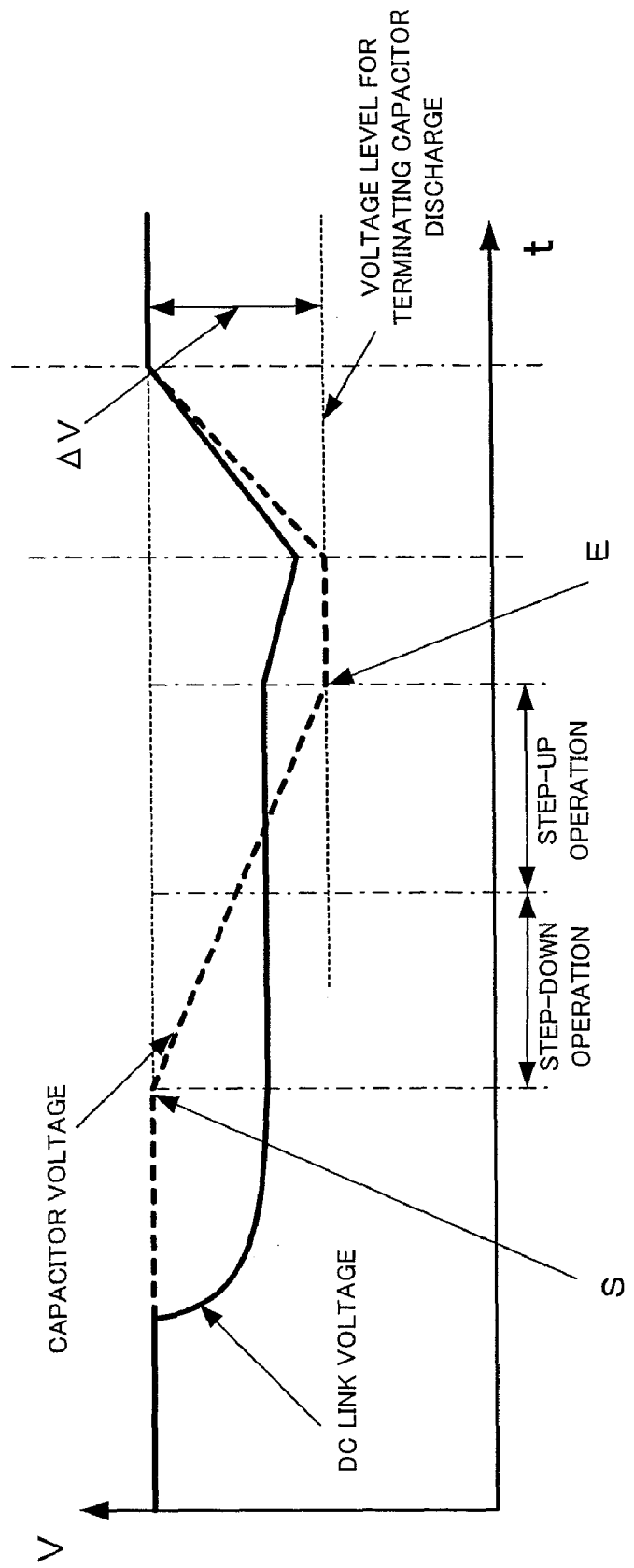

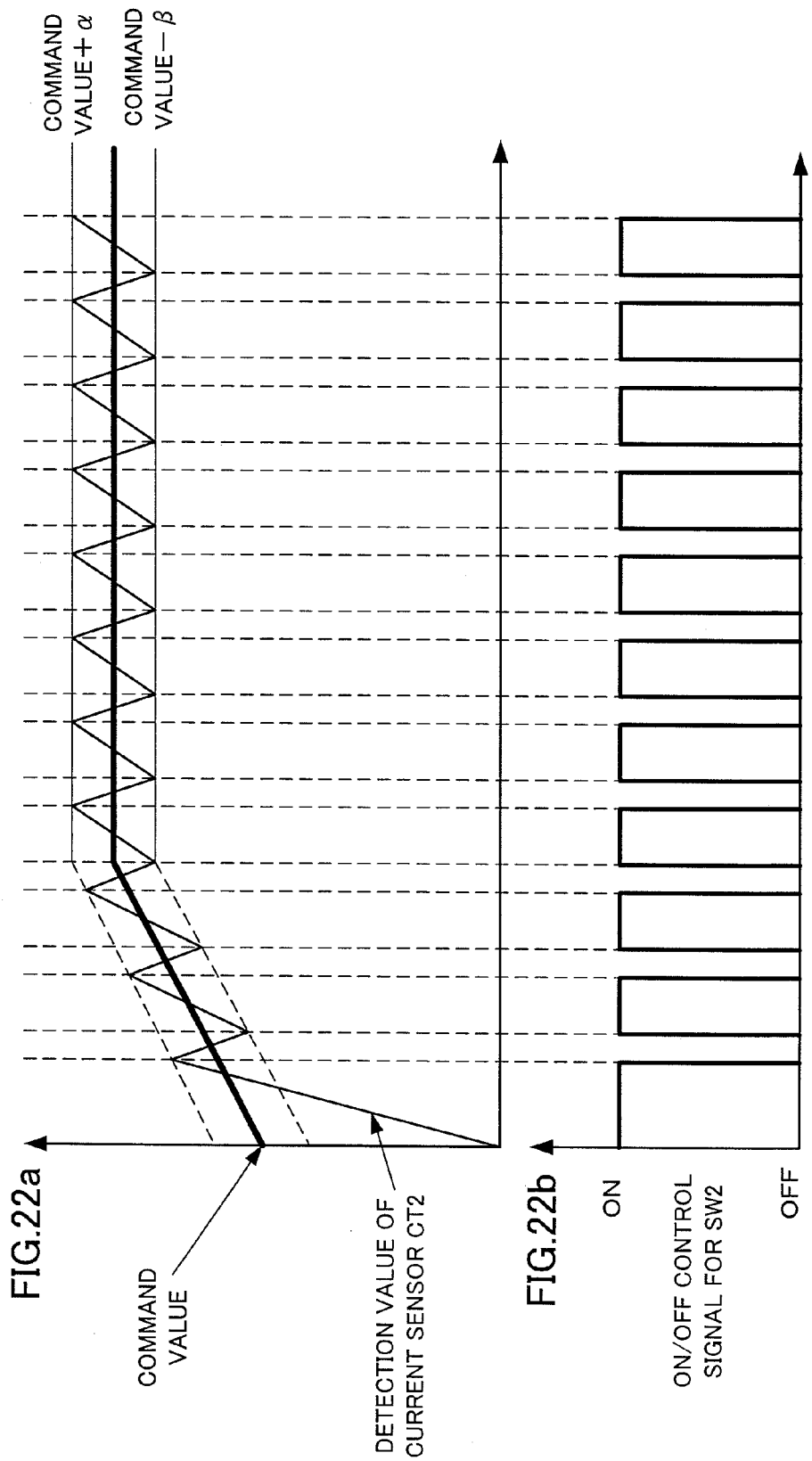

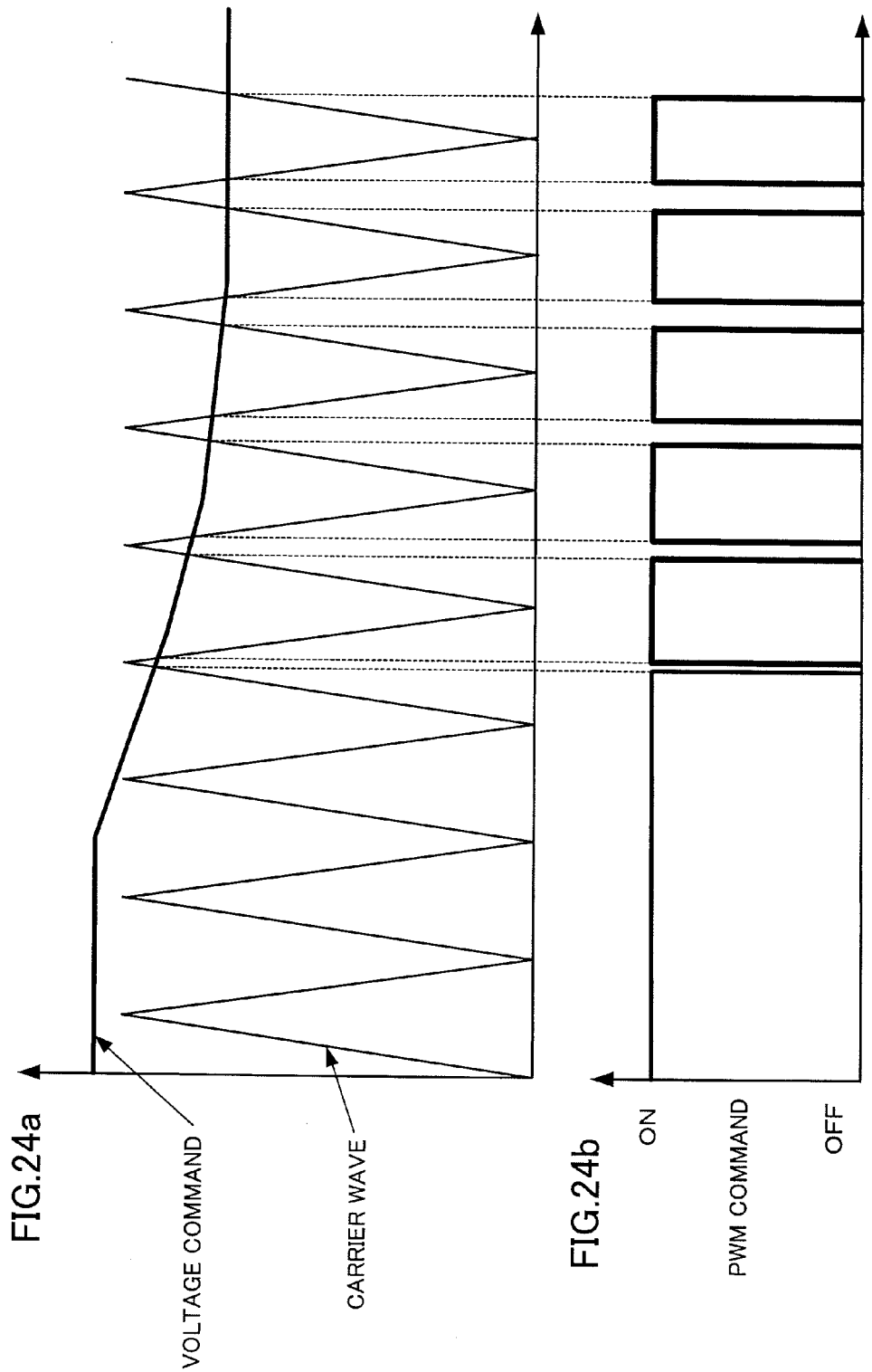

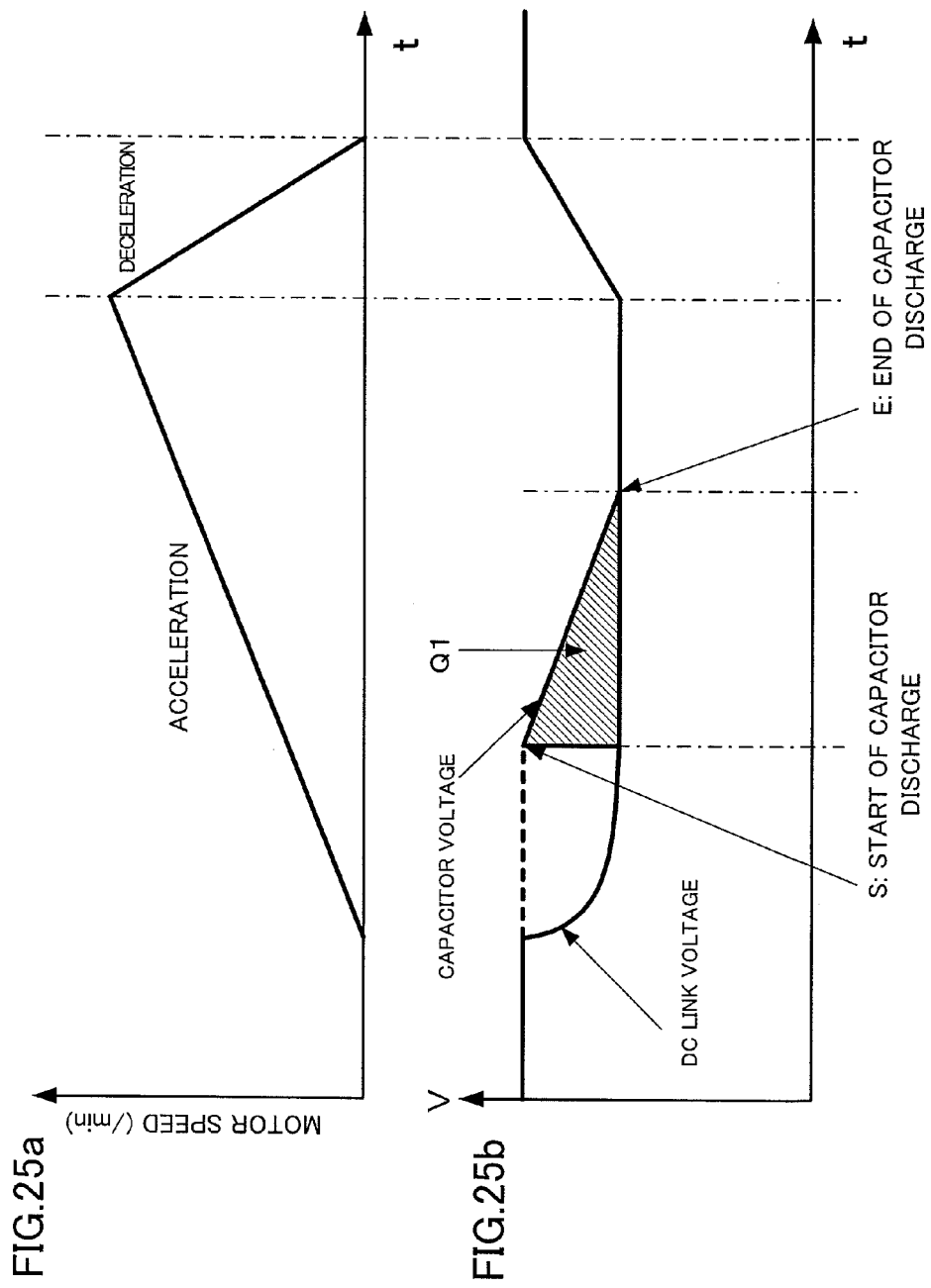

MOTOR CONTROLLER

RELATED APPLICATIONS DATA

This application claims priority under 35 U.S.C. §119 and/or §365 to Japanese Application No. 2008-073251 filed Mar. 21, 2008, the entire contents of which are incorporated herein by reference.

BACKGROUND OF THE INVENTION

1. Field of the Invention

The present invention relates to a motor controller, and more particular to a motor controller for accumulating electrical energy in a capacitor during deceleration of a motor and for supplying the electrical energy accumulated in the capacitor during acceleration of the motor.

2. Description of Related Art

A driving apparatus is known that includes a motor controller having a converter for receiving an AC voltage and performing AC-to-DC power conversion thereon, an inverter for receiving a DC voltage and performing DC-to-AC power conversion thereon, and a capacitor and a charging/discharging control circuit connected in parallel with a DC link between the converter and the inverter. Under the control of the charging/discharging control circuit, electrical energy is charged to the capacitor and the electrical energy accumulated in the capacitor is discharged.

In a driving apparatus of this type disclosed in JP 2000-141440A, electrical energy is supplied from the capacitor to the DC link when a voltage across the capacitor is equal to or higher than a DC link voltage of the DC link. FIGS. 25a and 25b show a relation between motor speed, DC link voltage, and capacitor voltage in the prior art motor controller.

The above-described conventional motor controller operates to supply electrical energy from the capacitor to the DC link when the capacitor voltage is equal to or higher than the DC link voltage of the DC link. When the capacitor voltage is lower than the DC link voltage, electrical energy cannot be supplied from the capacitor to the DC link.

With the prior art motor controller, the capacitor can only be discharged up to the DC link voltage as shown in FIGS. 25a and 25b. Thus, energy able to be discharged by the capacitor is small. When a difference between the capacitor voltage and the DC link voltage becomes small, the response of current supply to load change is deteriorated.

SUMMARY OF THE INVENTION

The present invention provides a motor controller capable of effectively utilizing electrical energy accumulated in a capacitor and achieving a reduction in capacitance of the capacitor.

A motor controller of the present invention comprises: a converter that converts input AC power into DC power; an inverter that inverts the converted DC power into AC power; a DC link that connects the converter and the inverter; and a capacitor and a charging/discharging control circuit that are connected in parallel with the DC link so that electrical energy is supplied from the DC link to the capacitor and vice versa through the charging/discharging control circuit, wherein the charging/discharging control circuit includes a discharge circuit that performs a step-up operation of raising a voltage of the capacitor while the electrical energy charged in the capacitor is discharged.

The discharge circuit may perform a step-down operation of lowing the voltage of the capacitor while the electrical energy charged in the capacitor is discharged.

The motor controller may further comprise first switching means that switches operations of the discharge circuit based on comparison between a voltage of the capacitor and a voltage of the DC link so that the discharge circuit performs the step-down operation when the voltage of the capacitor is higher than the voltage of the DC link, and performs the step-up operation when the voltage of the capacitor becomes lower than the voltage of the DC link.

The motor controller may further comprise second switching means that switches operations of the discharge circuit based on comparison between a voltage of the capacitor and a voltage of the DC link so that the discharge circuit performs the step-down operation when the voltage of the capacitor is higher than a sum of the voltage of the DC link and a predetermined voltage, and performs the step-up operation when the voltage of the capacitor becomes lower than the sum.

The step-down operation may be switched to the step-up operation when a discharge current flowing from the capacitor during the step-down operation decreases to a given value or less.

The motor controller may further comprise a comparator with hysteresis that compares a command value and a current flowing through the charging/discharging circuit, an switching element for controlling the current flowing through the charging/discharging circuit may be controlled in accordance with an output of the comparator so that the current flowing through the charging/discharging circuit follows the command value.

The command value may be corrected according to a voltage of the capacitor and a voltage of the DC link so that an average value of a current supplied from the charging/discharging circuit to the inverter during the step-up operation follows the command value.

The command value may be corrected according to an inverse ratio of the voltage of the capacitor and the voltage of the DC link.

The discharge of the electrical energy charged in the capacitor may be terminated when a voltage of the capacitor is decreased to a predetermined voltage or less.

The motor controller may further comprise notification means that notifies an external device of the decrease of the voltage of the capacitor to the predetermined voltage.

The predetermined voltage may be determined to a voltage obtained by subtracting a given value from a voltage of the DC link.

The predetermined voltage may be determined to a voltage obtained by subtracting a given value from a voltage of the DC link obtained by AC-to-DC power conversion by the converter.

When a voltage of the capacitor is lower than a voltage of the DC link and the inverter is in a regenerative state, the electrical energy may be supplied from the DC link to the capacitor to be charge while limiting a charge current into the capacitor to a predetermined value or less.

The predetermined value for limiting the charge current may be set to a sum of a limit value of current input to the converter and a regenerative current from the inverter.

The motor controller may further comprise a comparator with hysteresis that compares a value of current flowing through the charging/discharging control circuit and a limit value, wherein a switching element for controlling the current flowing through the charging/discharging control circuit is controlled in accordance with an output of the comparator so as to limit a charge current into the capacitor.

A switching element for controlling a current flowing through the charging/discharging control circuit may be controlled in accordance with a PWM command produced based on a result of an arithmetic operation using a value of the current flowing through the charging/discharging control circuit and a predetermined limit value so that a charge current into the capacitor follows the predetermined limit value.

With the present invention, electrical energy can be supplied from the capacitor to the DC link even if the voltage of the capacitor is lower than the DC link voltage of the DC link, whereby electrical energy accumulated in the capacitor can effectively be utilized and the capacitance of the capacitor can be made small.

BRIEF DESCRIPTION OF THE DRAWINGS

FIGS. 12a and 12b are views for describing electric currents in the second discharge operation described referred to FIG. 11;

FIG. 15 is a view for describing a ninth embodiment of this invention in which the predetermined voltage at which the discharge is to be completed is equal to a voltage determined by subtracting a given value from a DC link voltage;

FIG. 16 is a view for describing a tenth embodiment of this invention in which the predetermined voltage at which the discharge is to be completed is made equal to a voltage determined by subtracting a given value from a DC link voltage, which is obtained by AC-to-DC power conversion of an input AC voltage by a converter;

FIGS. 22a and 22b are views showing hysteresis control;

FIGS. 24a and 24b are views for describing the generation of a PWM command in this invention; and FIGS. 25a and 25b are views showing a relation between motor speed, DC link voltage, and capacitor voltage in a prior art motor controller.

DETAILED DESCRIPTION

Figure 1:
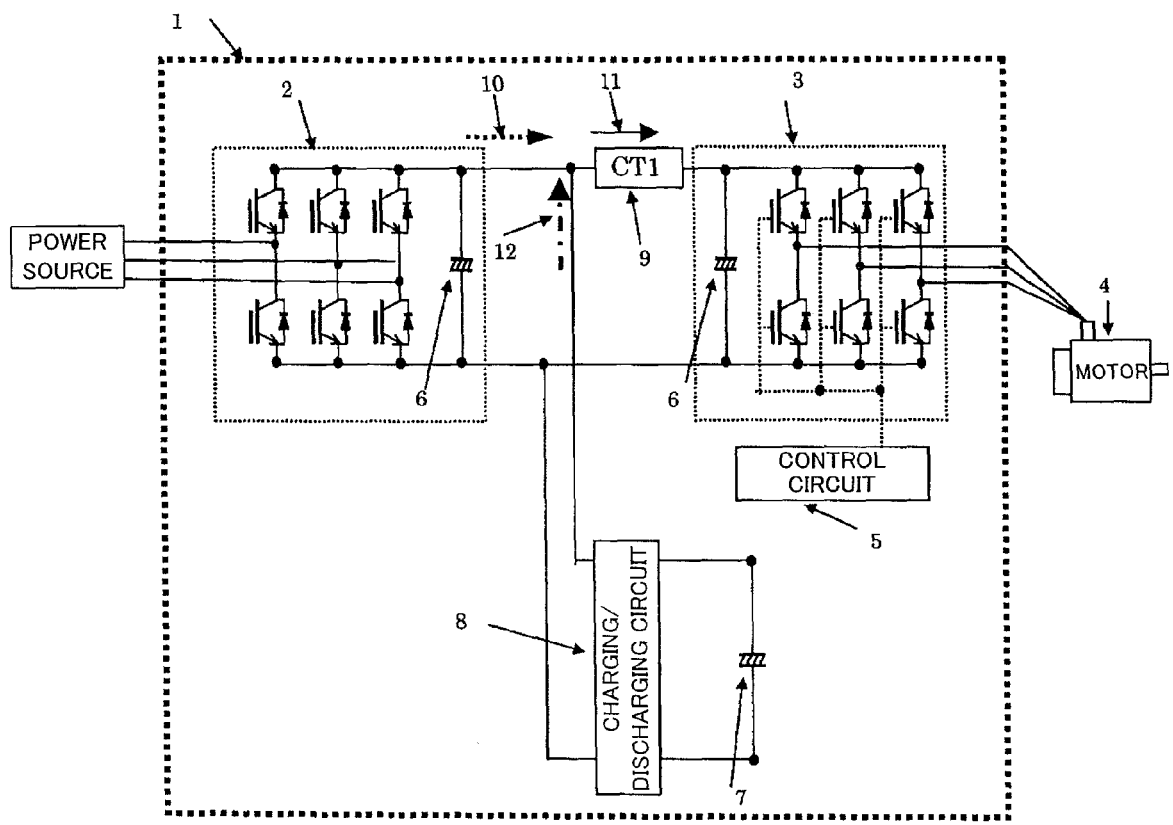
FIG. 1 is a block diagram showing the essential part of an embodiment of a motor controller of this invention.

FIG. 1 shows in block diagram the essential part of an embodiment of a motor controller of this invention. As shown in FIG. 1, the motor controller 1 is adapted to be supplied with AC voltage from a power source (three-phase power source). A converter 2 is for converting AC voltage into DC voltage. An inverter 3 is for converting the DC voltage into AC power of variable voltage and variable frequency and for supplying the AC power to a motor 4.

Smoothing capacitors 6 connected in parallel with and between the converter 2 and the inverter 3 are for smoothing DC voltage obtained by conversion by the converter 2 and for inputting the smoothened DC voltage to the inverter 3. A connection part by which the converter 2 is electrically connected with the inverter is called a DC link.

The converter 2 includes a bridge circuit comprised of power elements (such as for example, transistors) and diodes which are connected in inverse-parallel with the power elements. With the converter 2, three-phase AC power is full-wave rectified by the six diodes at power running, and the six power elements operate to divert regenerative power to the power source at power regeneration.

The inverter 3 includes a bridge circuit comprised of power elements (such as for example, transistors) and diodes which are connected in inverse-parallel with the power elements. The power elements are ON/OFF controlled by an inverter control circuit 5 to thereby convert the DC voltage produced by conversion by the converter 2 into AC voltage, and the resultant AC power is supplied to the motor 4.

A first electric current sensor, CT1 (9), is for measuring a value of electric current flowing into the inverter 3.

A capacitor 7 is connected in parallel with the smoothing capacitors 6 of the DC link via the charging/discharging control circuit 8. Under the control of the charging/discharging control circuit 8, the capacitor 7 supplies electrical energy to the inverter 3 and is charged with regenerative electrical energy supplied from the motor 4. The details of the charging/discharging control circuit 8 are described with reference to FIG. 2.

Figure 2:
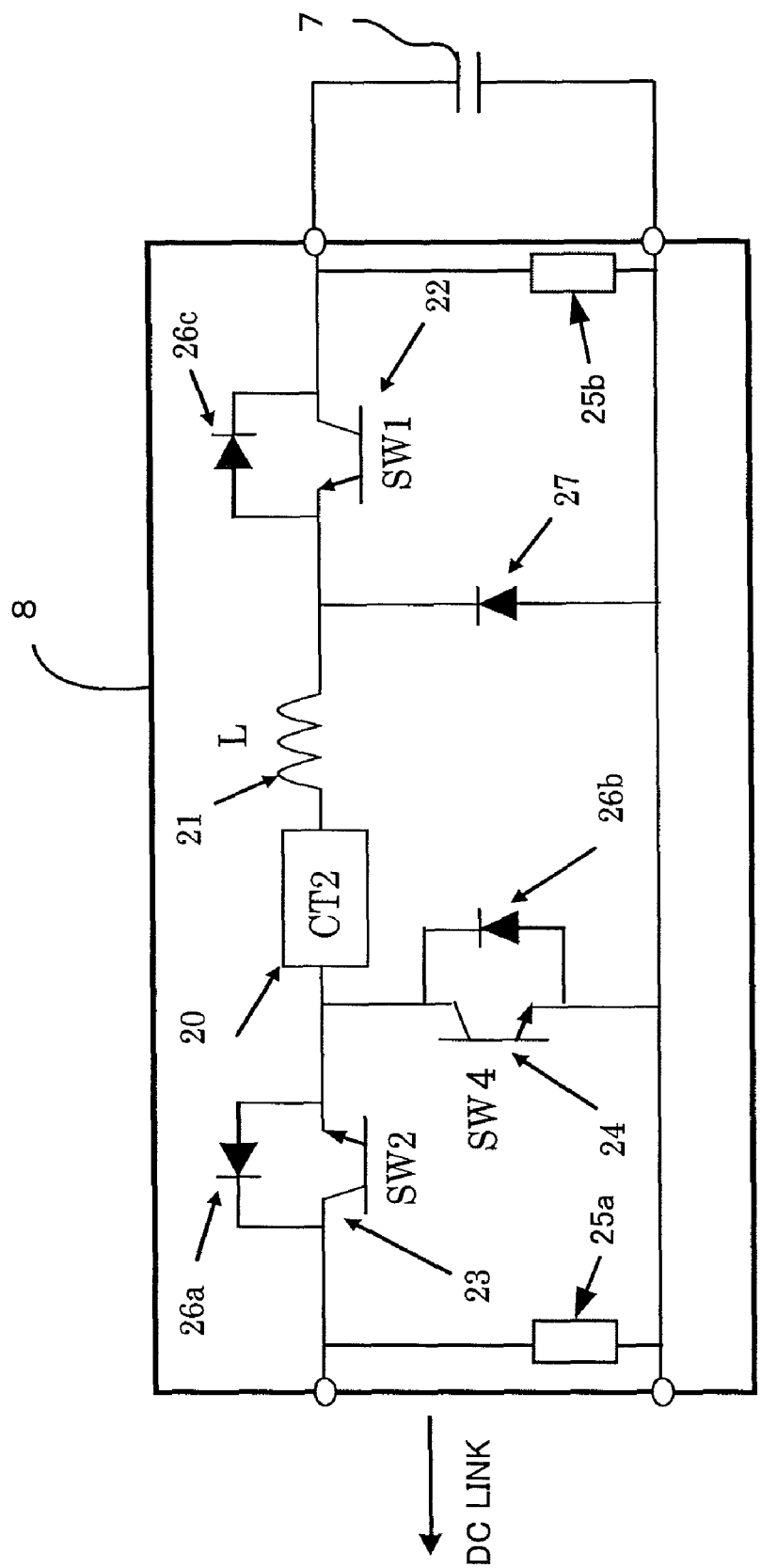
FIG. 2 is a view showing an example charging/discharging control circuit for use in the motor controller of this invention.

FIG. 2 shows in a block diagram the essential part of the example charging/discharging control circuit 8 according to the embodiment of this invention. As described in the embodiment of the motor controller in FIG. 1, the charging/discharging control circuit 8 is connected in parallel with the DC link of the motor controller 1. The charging/discharging control circuit 8 is connected with the capacitor 7 adapted to be charged with regenerative electrical energy supplied from the motor 4. The charging/discharging control circuit 8 includes a CT2 (20) as a second electric current sensor, voltage sensors 25a and 25b, a DC reactor 21, a SW1 (22) as a discharge control switch, a SW2 (23) as a charge control switch, a SW4 (24) as a step-up switch, and diodes 26a, 26b, 26c and 27. The switches SW1 (22), SW2 (23), and SW4 (24) are each implemented, for example, by an IGBT or the like. The voltage sensor 25a detects a DC link voltage Vdc as a voltage of the DC link, and the voltage sensor 25b detects a capacitor voltage Vc of the capacitor 7. The CT2 (20) or second current sensor detects charge and discharge currents of the charging/discharging control circuit 8.

Figure 3:
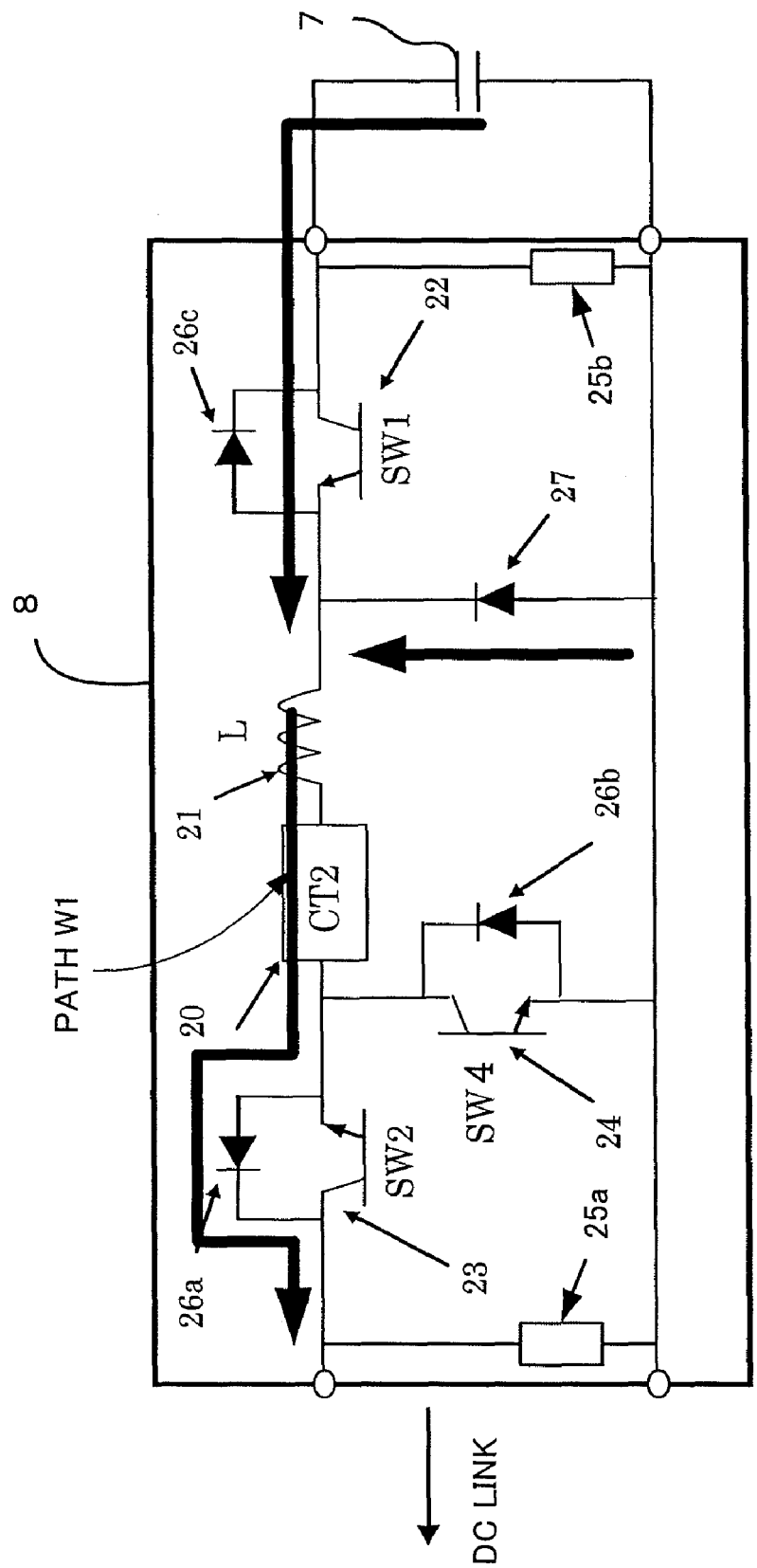
FIG. 3 is a view describing a first discharge operation of the charging/discharging control circuit in FIG. 2.
Figure 4:
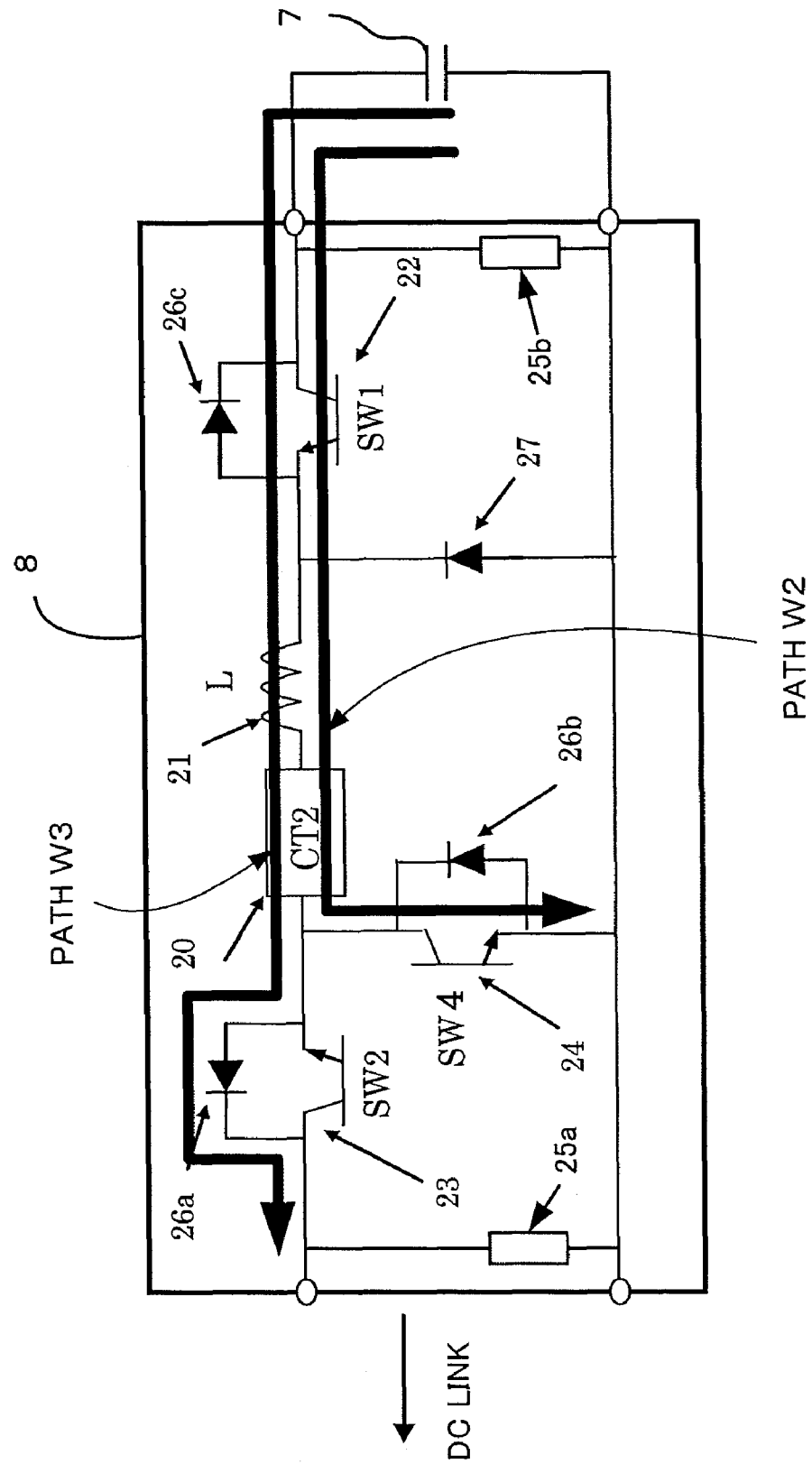
FIG. 4 is a view describing a second discharge operation of the charging/discharging control circuit in FIG. 2.

Next, with reference to FIGS. 3 and 4, a discharge operation of the capacitor 7 performed under the control of the charging/discharging control circuit 8 in FIG. 2 is described, with the discharge operation divided into first and second discharge operations. The first discharge operation is shown in FIG. 3, and the second discharge operation is shown in FIG. 4.

The first discharge operation is implemented in a case that electric current flows from the capacitor 7 into the DC link and the voltage Vc of the capacitor 7 is higher than the DC link voltage Vdc of the DC link. The first discharge operation is therefore a step-down operation in which the voltage of the capacitor 7 is lowered while the electrical energy charged in the capacitor 7 is discharged.

The second discharge operation is implemented in a case that electric current flows from the capacitor 7 into the DC link and the voltage Vc of the capacitor 7 is lower than the DC link voltage Vdc of the DC link. The second discharge operation is therefore a step-up operation in which the voltage of the capacitor 7 is raised while the electrical energy charged in the capacitor 7 is discharged.

The following is a description of the first discharge operation (step-down operation) (see FIG. 3).

When the SW1 (22) is made ON and the SW2 (23) and the SW4 (24) are kept in an OFF state, electric current flows from the capacitor 7 to the DC link along a path shown at W1. At that time, the discharge current increases.

When the SW1 (22) is made OFF, electric current flows into the diode 27 due to the presence of magnetic energy (electrical energy) accumulated in the DC reactor 21. At that time, the discharge current decreases.

When the SW1 (22) is made ON, the discharge current flowing from the capacitor 7 increases. When the SW1 (22) is made OFF, the discharge current decreases. Thus, the discharge current flowing from the capacitor 7 can be controlled by controlling the ON and OFF of the discharge control switch SW1 (22).

The following is a description of the second discharge operation (step-up operation) (see FIG. 4).

When the SW1 (22) and the SW4 (24) are made ON and the SW2 (23) is kept in an OFF state, electric current flows from the capacitor 7 to the DC reactor 21 along a path shown at W2. At that time, the discharge current increases.

When the SW4 is made OFF with the SW1 kept ON, electric current flows to the DC link along a path shown at W3 due to the presence of magnetic energy (electrical energy) accumulated in the DC reactor 21. At that time, the discharge current decreases.

When the SW4 (24) is made ON with the SW1 (22) kept ON, the discharge current from the capacitor 7 increases. When the SW4 (24) is made OFF, the discharge current decreases. In other words, the discharge current from the capacitor 7 can be controlled by controlling the ON and OFF of the step-up switch SW4 (24) with the discharge control switch SW1 (22) kept ON.

Next, a charge operation is described.

Figure 5:
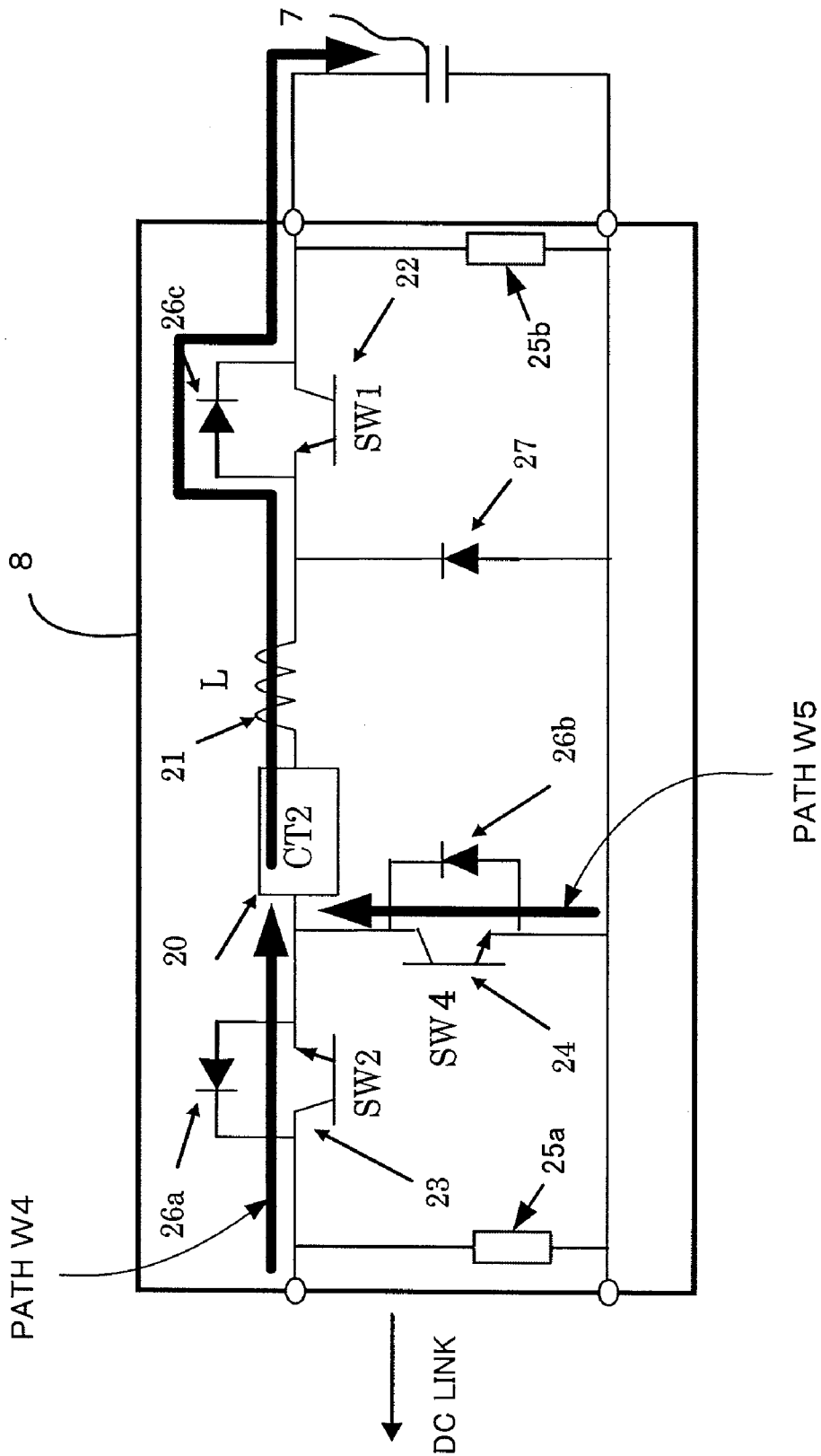
FIG. 5 is a view describing a charge operation of the charging/discharging control circuit in FIG. 2.

With reference to FIG. 5, an operation for charging the capacitor 7 by the charging/discharging control circuit 8 is described. In the following, the charge operation is described for a case where electric current flows from the DC link into the capacitor 7, i.e., the voltage Vc of the capacitor 7 is lower than the DC link voltage Vdc of the DC link.

When the SW2 (23) is made ON with the SW1 (22) and the SW4 (24) kept in an OFF state, the charge current flows into the capacitor 7 along a path shown at W4 (see FIG. 5). At that time, the charge current increases.

When the SW2 (23) is made OFF, the current flows into the diode 26b along a path W5 (see FIG. 5) due to the presence of magnetic energy (electrical energy) accumulated in the DC reactor 21. At that time, the charge current decreases.

The charge current supplied to the capacitor 7 can be controlled by controlling the ON and OFF of the charge control switch SW2 (23). The SW1 and the SW4 are in the OFF state at that time.

Figures 6A, 6B:
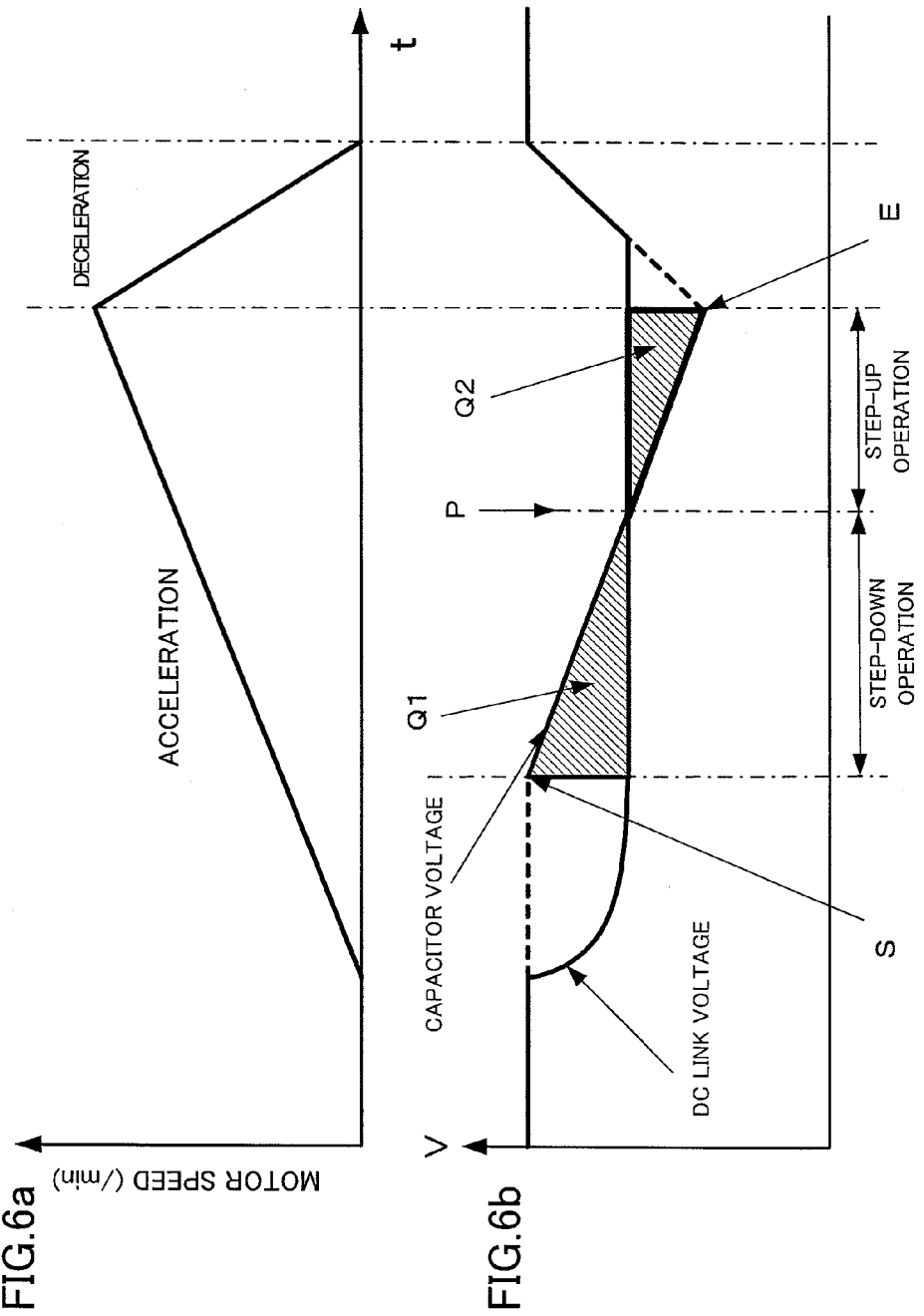
FIGS. 6a and 6b are views showing a relation between motor speed, DC link voltage, and capacitor voltage in the motor controller of this invention.

With reference to FIGS. 6a and 6b, a description is given of an operation by which electrical energy is able to be supplied from the capacitor 7 to the DC link by the charging/discharging control circuit 8 in FIG. 2 irrespective of whether the capacitor voltage VC of the capacitor 7 is equal to or higher than the DC link voltage Vdc of the DC link or lower than the DC link voltage Vdc.

FIGS. 6a and 6b show a relation between motor speed, DC link voltage Vdc, capacitor voltage Vc, step-down operation (first discharge operation), and step-up operation (second discharge operation) in the motor controller 1. FIG. 6a shows acceleration and deceleration of the motor drivingly controlled by the motor controller 1. FIG. 6b shows a relation between DC link voltage Vdc and capacitor voltage Vc at the motor acceleration and deceleration in FIG. 6a.

When the voltage Vc of the capacitor 7 is higher than the voltage Vdc of the DC link, the discharge from the capacitor 7 to the DC link is performed by the step-down operation (first discharge operation).

The electrical energy supply from the capacitor 7 to the DC link is continued by the step-up operation (second discharge operation) as shown in FIG. 6b, even when the capacitor voltage Vc of the capacitor 7 becomes equal to or lower than the DC link voltage Vdc of the DC link. The energy supply is thus made greater than in the prior art by an amount of electrical energy supply from the capacitor 7 to the DC link by the step-up operation.

In other words, the capacitance of the capacitor required to supply the same regenerative electrical energy can be decreased as compared to the prior art.

In FIG. 6b, Q1 and Q2 represent discharge energy but do not directly indicate electrical energy since FIG. 6b is a graph simply showing a relation between voltage and time. An amount of electrical energy can however be calculated in accordance with the relation between voltage and time shown in the graph.

Figures 7A, 7B:
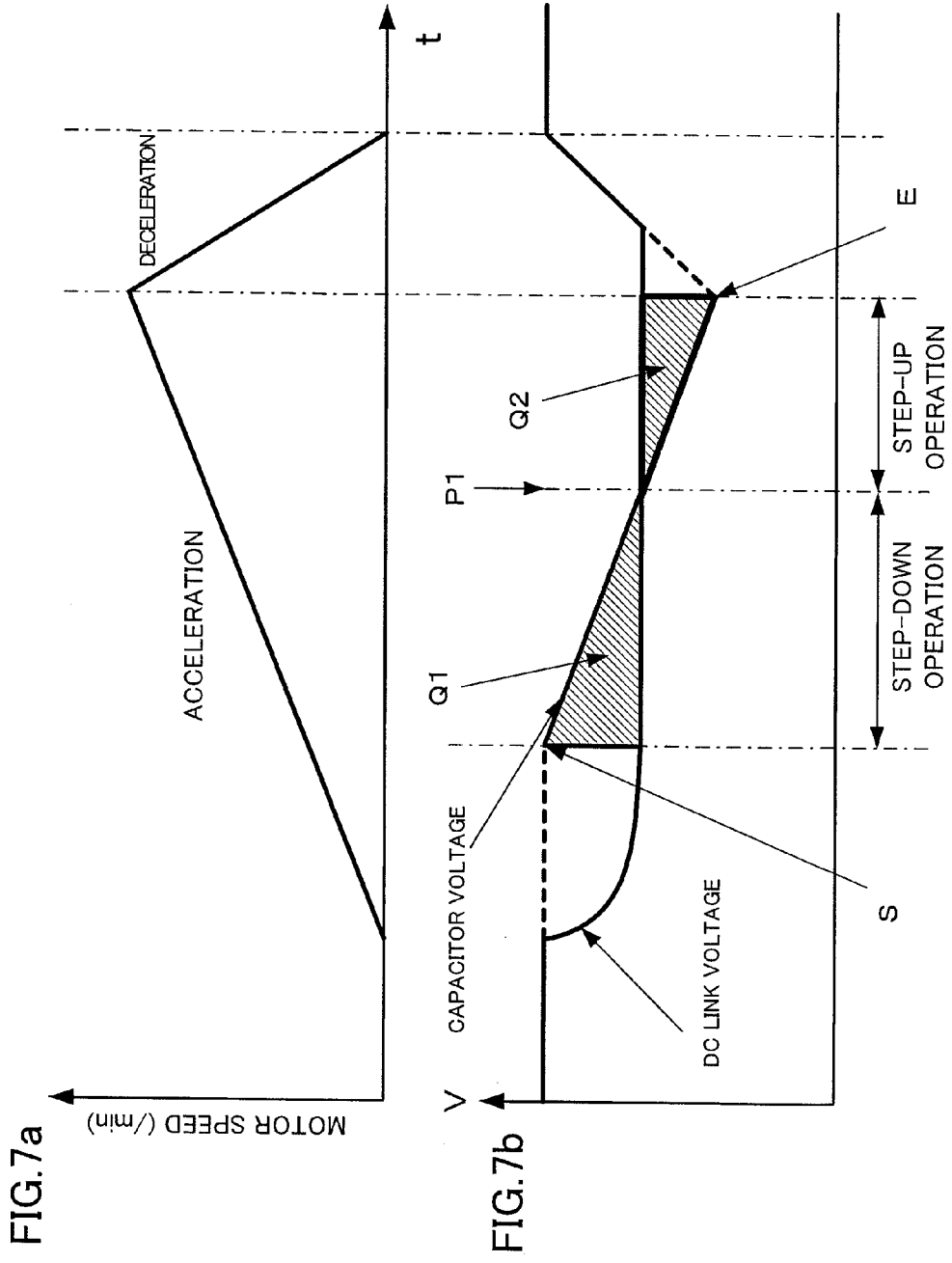
FIGS. 7a and 7b are views for describing a first embodiment of this invention in which switching between step-down operation and step-up operation is automatically performed.

FIGS. 7a and 7b show an embodiment of this invention (first embodiment) in which switching between step-down operation and step-up operation (first and second discharge operations) is automatically carried out. Voltage sensors 25a and 25b, which are voltage measurement means for measuring the DC link voltage Vdc of the DC link and the capacitor voltage Vc of the capacitor 7, are provided in the motor controller 1 and the charging/discharging control circuit 8 of the embodiment of this invention shown in FIGS. 1 and 2. The voltage Vc of the capacitor 7 and the DC link voltage Vdc are measured and compared with each other. Automatic switching is performed such that the step-down operation (see FIG. 3) is implemented when the voltage value Vc of the capacitor 7 is higher than the DC link voltage value Vdc of the DC link and the step-up operation (see FIG. 4) is implemented when the voltage value of the capacitor 7 is lower than the DC link voltage value of the DC link. In FIG. 7b, a shift from the step-down operation to the step-up operation takes place at a switching point P between step-down operation and step-up operation.

Figures 8A, 8B:
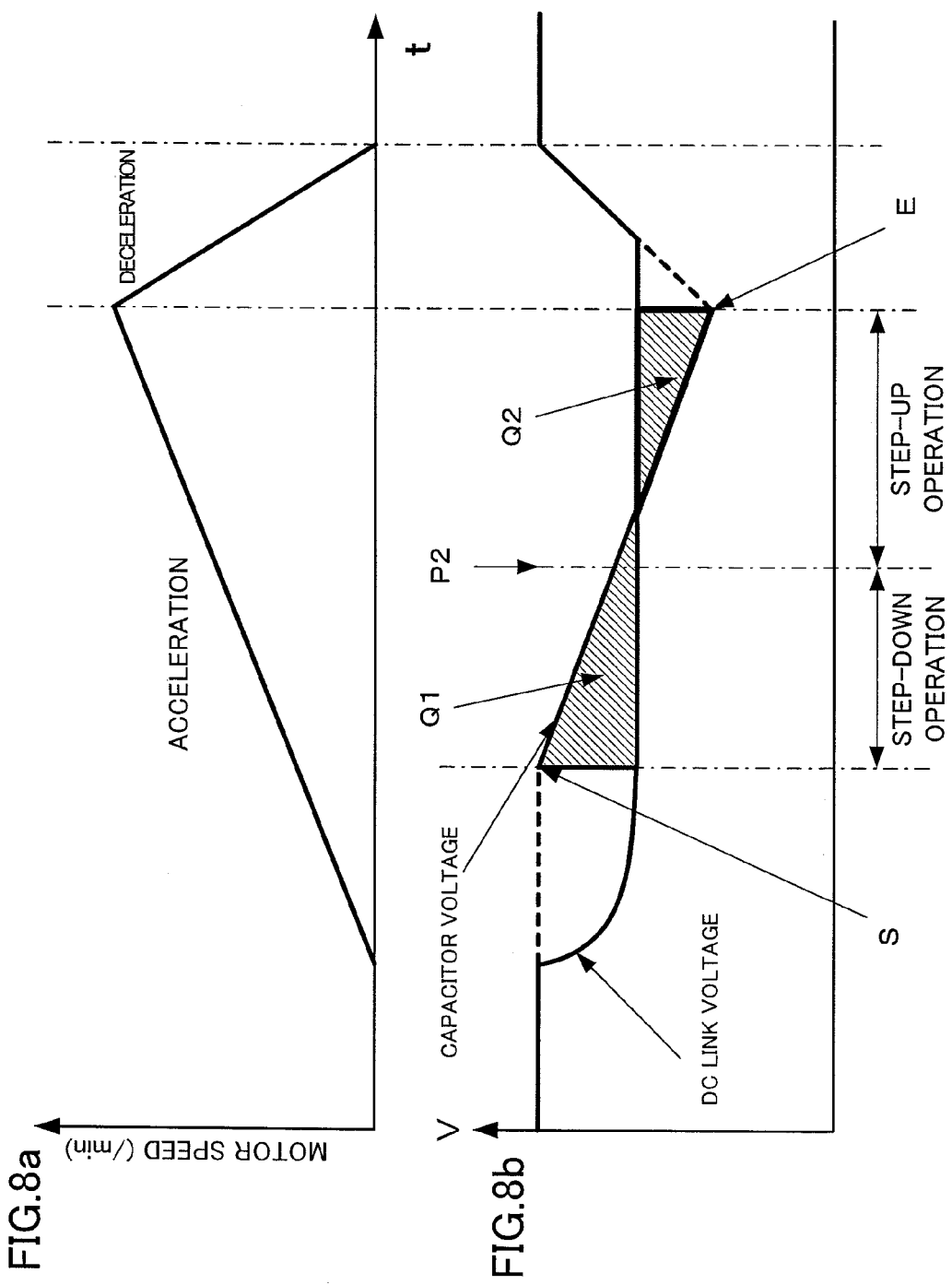
FIGS. 8a and 8b are views for describing a second embodiment of this invention in which switching between step-down operation and step-up operation is automatically performed.

FIGS. 8a and 8b are for describing an embodiment of this invention (second embodiment) in which switching between step-down operation and step-up operation (first and second discharge operations) is automatically carried out. Specifically, the voltage value Vc of the capacitor 7 connected to the charging/discharging control circuit 8 is compared with the DC link voltage value Vdc of the DC link, and automatic switching is carried out. Specifically, switching to the step-down operation (first discharge operation) (see FIG. 3) is made when the voltage value Vc of the capacitor 7 is higher than the sum of the DC link voltage value Vdc of the DC link and a predetermined voltage. On the other hand, when the voltage value Vc of the capacitor 7 is lower than the sum of the DC link voltage value Vdc of the DC link and the predetermined voltage, switching to the step-up operation (see FIG. 4) is made to avoid a reduction in discharge current and deteriorated response in the current control, which are caused when a difference between these voltage values becomes small in the step-down operation. In FIG. 8b, it is indicated that the switching from the step-down operation to the step-up operation is made at P2, i.e., when the capacitor voltage Vc is higher than the DC link voltage Vdc of the DC link.

Figure 9:
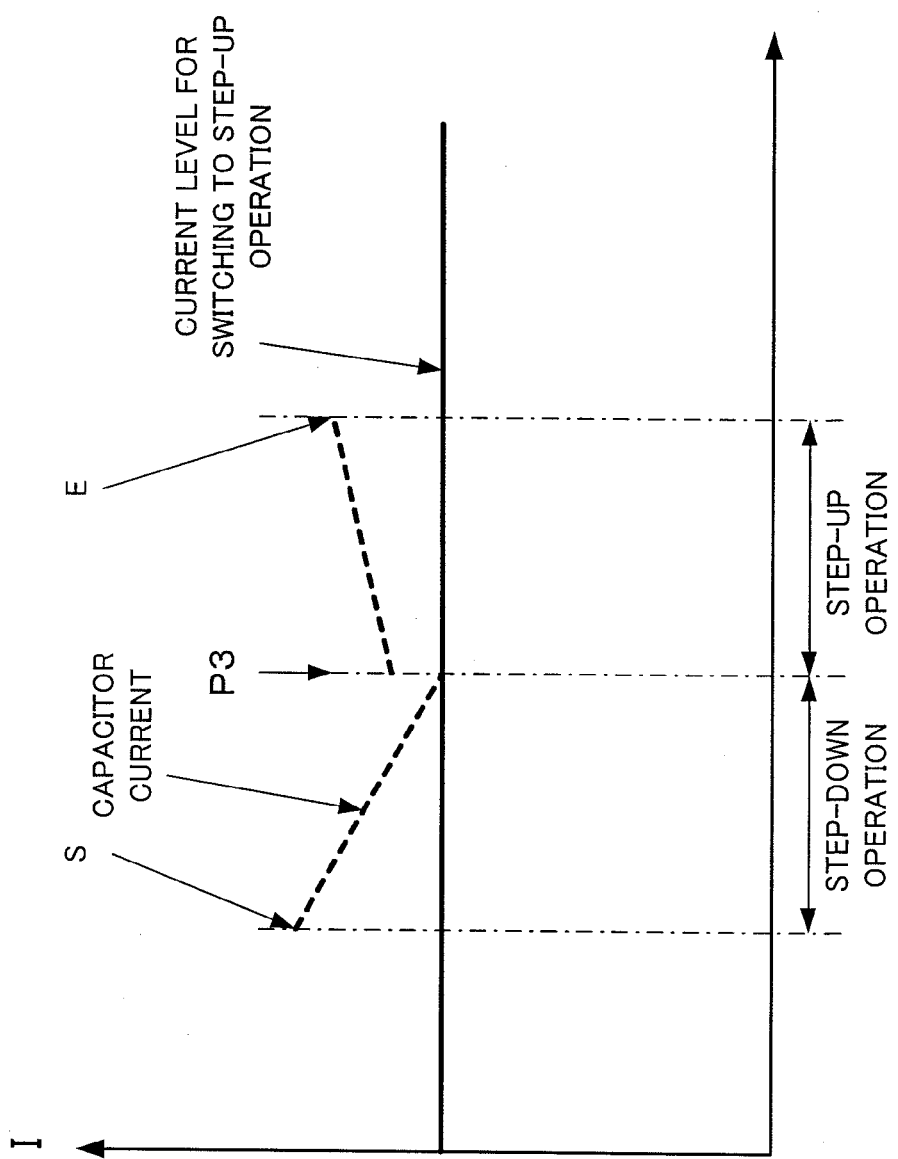
FIG. 9 is a view for describing a third embodiment of this invention in which switching between step-down operation and step-up operation is automatically performed.

FIG. 9 is for describing an embodiment of this invention (third embodiment) in which switching between the step-down operation and the step-up operation (first and second discharge operations) is automatically carried out. When the discharge current flowing from the capacitor 7 becomes equal to or less than a given value during the step-down operation, switching to the step-up operation is automatically carried out to avoid a reduction in discharge current and deteriorated response in current control caused when a difference therebetween becomes small in the step-down operation. As shown in FIG. 9, a timing P3 of switching from the step-down operation to the step-up operation is determined according to magnitude of the discharge current from the capacitor 7.

Figure 10:
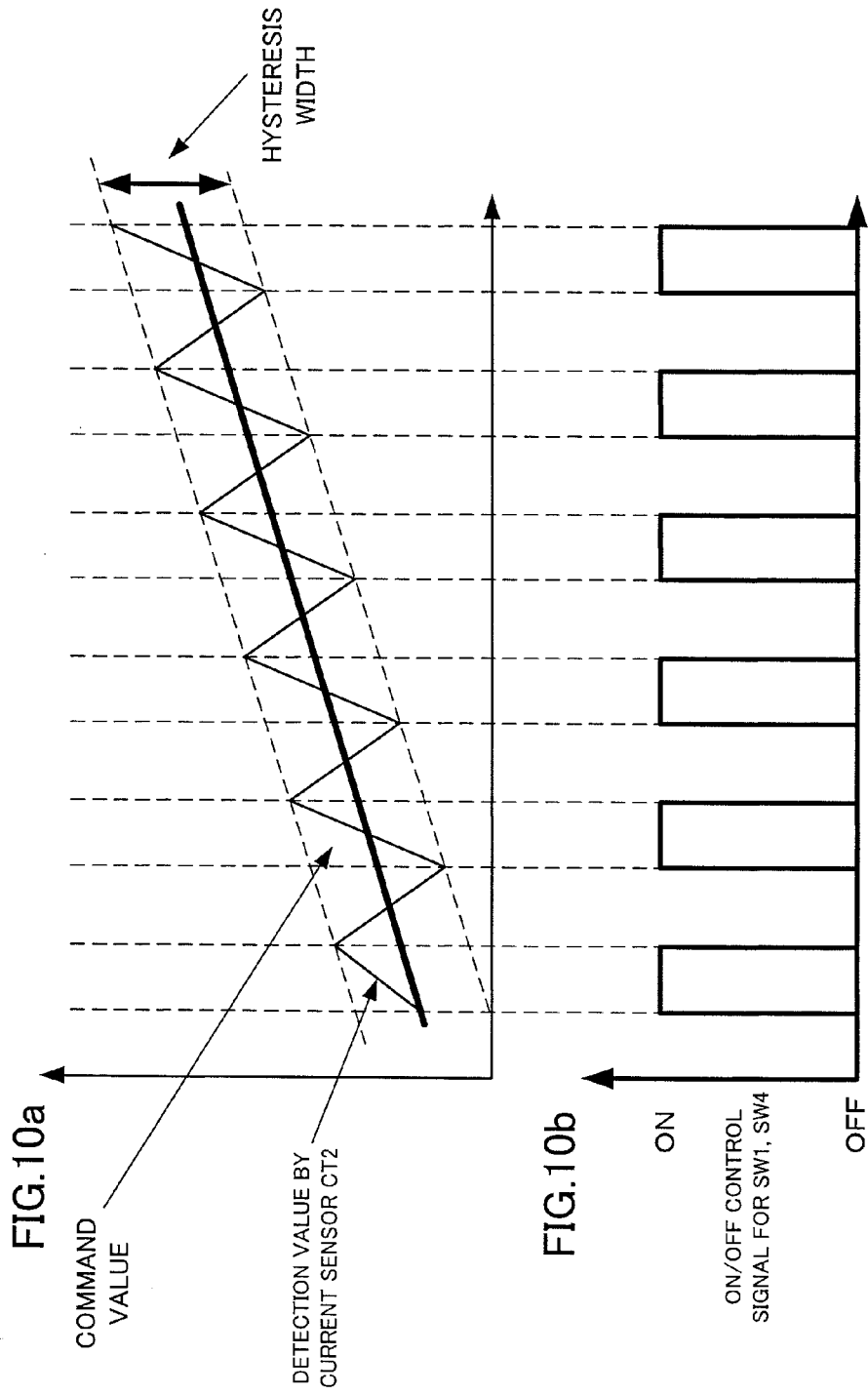
FIGS. 10a and 10b are views for describing a fourth embodiment of this invention in which the charging/discharging control circuit in FIG. 2 is controlled by use of a comparator with hysteresis.

FIGS. 10a and 10b are for describing an embodiment of this invention (fourth embodiment) in which the charging/discharging control circuit 8 in FIG. 2 is controlled by use of a comparator with hysteresis. To make a value of current flowing through the charging/discharging control circuit 8 (see FIG. 2) coincident with a current command value, a comparator is used having a hysteresis characteristic between the current command value and the value of current flowing through the charging/discharging control circuit 8, and a switching element for controlling the current of the charging/discharging control circuit 8 is controlled in accordance with an output of the comparator.

In the step-down operation (first discharge operation), the discharge control switch SW1 (22) is ON/OFF switched in accordance with the output of the comparator, whereby the discharge from the capacitor 7 to the DC link is performed. At that time, the SW2 (23) and the SW4 (24) are in an OFF state. In the step-up operation (second discharge operation), the step-up switch SW4 (24) is ON/OFF switched according to the output of the comparator, whereby the discharge from the capacitor 7 to the DC link is performed. At that time, the SW1 is in an ON state and the SW2 (23) is in an OFF state. As shown in FIG. 10b, the SW1 (22) and the SW4 (24) are ON/OFF controlled in accordance with the hysteresis characteristic of the comparator.

Since a switching pattern of the SW4 (24) is defined based on current value detected by the second current sensor (CT2) of the charging/discharging control circuit 8 (see FIG. 2), the voltage of the capacitor 7 decreases at each execution of switching, which makes it gradually difficult to cause the current to flow according to the current command.

Figure 11:
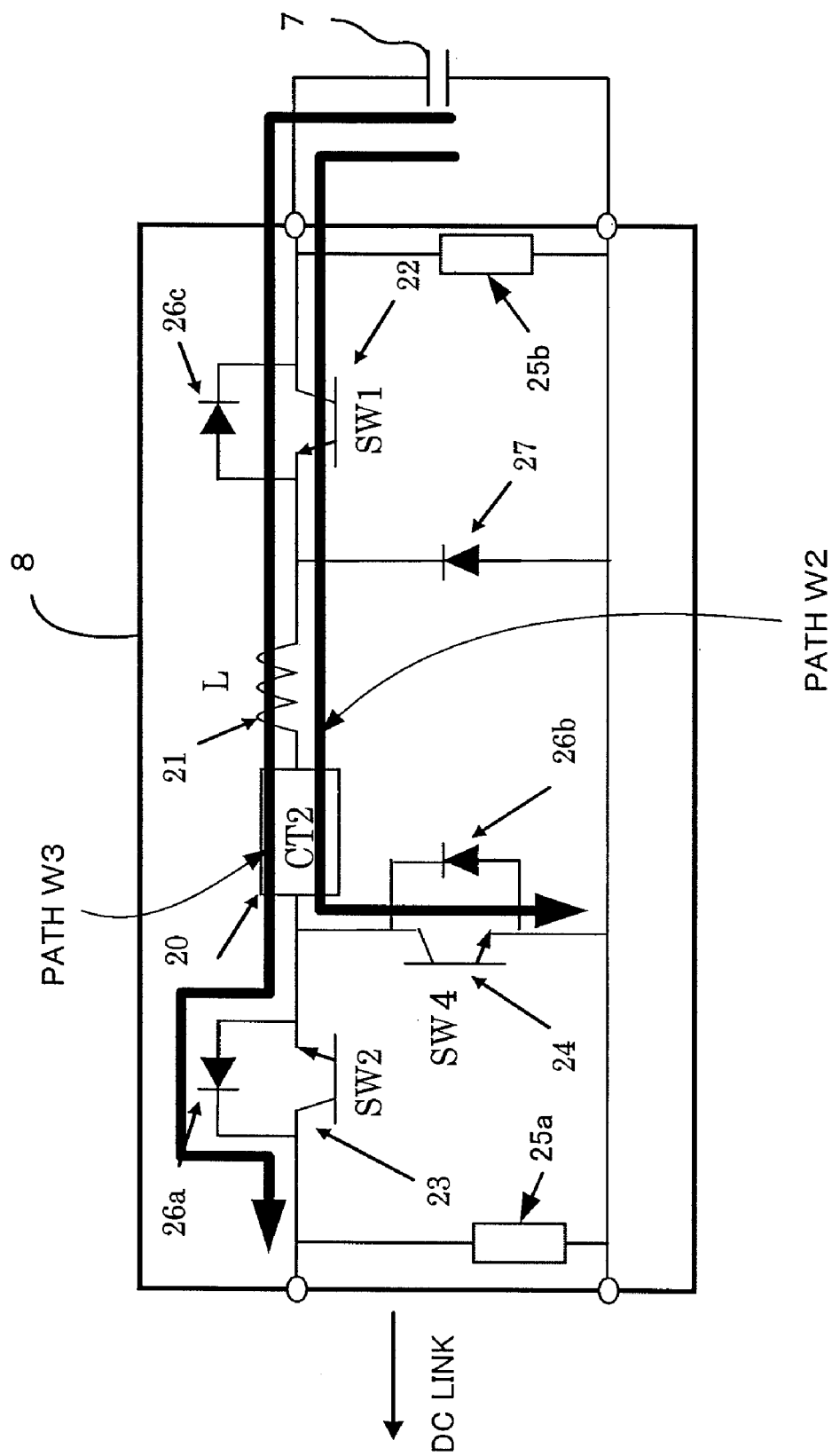
FIG. 11 is a view for describing a fifth embodiment of this invention in which an average of current value supplied from the charging/discharging control circuit to an inverter in a step-up operation (second discharge operation) is controlled so as to coincide with a current command value.

FIG. 11 is for describing an embodiment (fifth embodiment) in which an average of current value supplied from the charging/discharging control circuit 8 to the inverter 3 in the step-up operation (second discharge operation) (see FIG. 4) is controlled so as to coincide with the current command value. Specifically, the current command value is corrected in accordance with the voltage Vc of the capacitor 7 connected to the charging/discharging control circuit 8 and the voltage Vdc of the DC link. How the current command value is corrected will be described with reference to FIGS. 13a to 13c.

The term "average of current value" indicates an average current of current flowing from the capacitor 7 along the path W3 in the second discharge operation (see FIG. 12b). The discharge current from the capacitor 7 is controlled by repeating the ON and OFF of the SW4 (24). When the SW4 (24) is ON, the current flow along the path W3 is at zero. Thus, the current flowing along the path W3 has a waveform such as shown in FIG. 12b. In other words, the average of current value represents a value obtained by averaging the current flowing along the path W3.

Figure 13A:
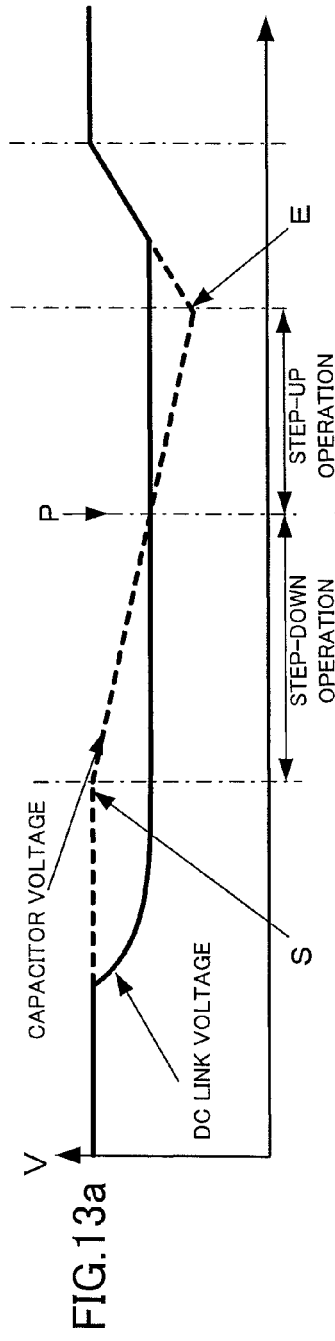
FIGS. 13a to 13c are views for describing a sixth embodiment of this invention in which a current command value is corrected.
Figure 13B:
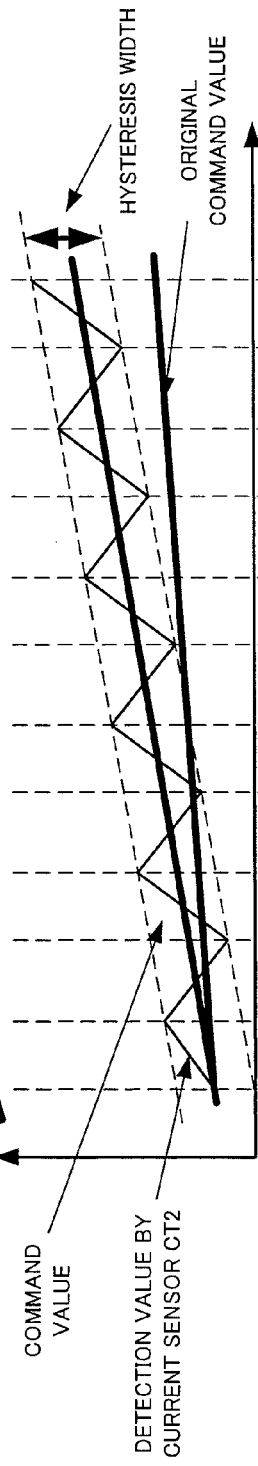
Figure 13C:
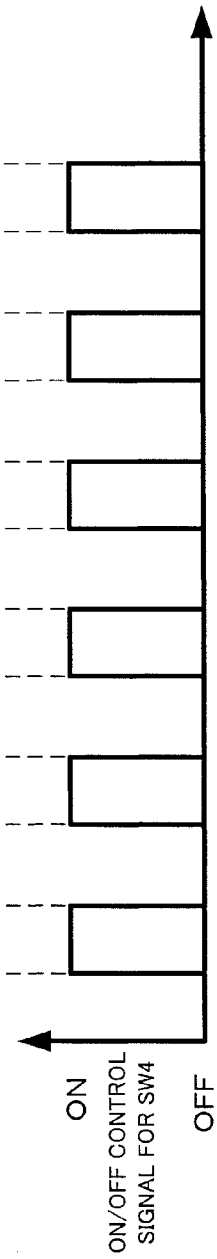

FIGS. 13a to 13c are for describing how the current command value is corrected. The term "command value" in FIG. 13b represents the current command value. FIGS. 13b and 13c show a relation between ON/OFF control signal for the step-up switch SW4 (24), current value detected by the second current sensor (CT2) 20, and current command value in the step-up operation shown in FIG. 13a.

As shown in FIG. 13b, the original command value (original current command value) is corrected to a corrected command value (corrected current command value). By correcting the current value in accordance with the voltage Vdc of the DC link and the capacitor voltage Vc of the capacitor 7 in this manner, the current can be output from the capacitor 7 as originally intended.

To correct the current command value, an inverse ratio of the capacitor voltage Vc of the capacitor 7 connected to the charging/discharging control circuit 8 and the DC link voltage Vdc of the DC link is used, or an alternative approximate expression is used, whereby a correction value for the current command value increases with the decrease caused by discharge in the capacitor voltage Vc of the capacitor 7 (sixth embodiment). In the graph of FIG. 13b showing how the current command value is corrected, it is indicated that the correction amount increases with elapse of time due to an increasing deviation between the original and corrected current command values.

In the step-up operation (second discharge operation), i.e., when the capacitor voltage Vc of the capacitor 7 is smaller than the DC link voltage Vdc of the DC link (Vc<Vdc), if an attempt is made to cause the current value detected by the second current sensor (CT2) 20 of the charging/discharging control circuit 8 in FIG. 2 to follow the current command value I, the current Iout actually output to the DC link theoretically becomes equal to a value of I×(Vc/Vdc). The current Iout therefore becomes smaller than the original current command value I (because there is a relation of Vc/Vdc<1). To obviate this, the current Iout is multiplied by a value of (Vdc/Vc) or its approximate value, thereby correcting the original current command value I such that the actual current value Iout becomes close to the current command value I.

Figure 14A:
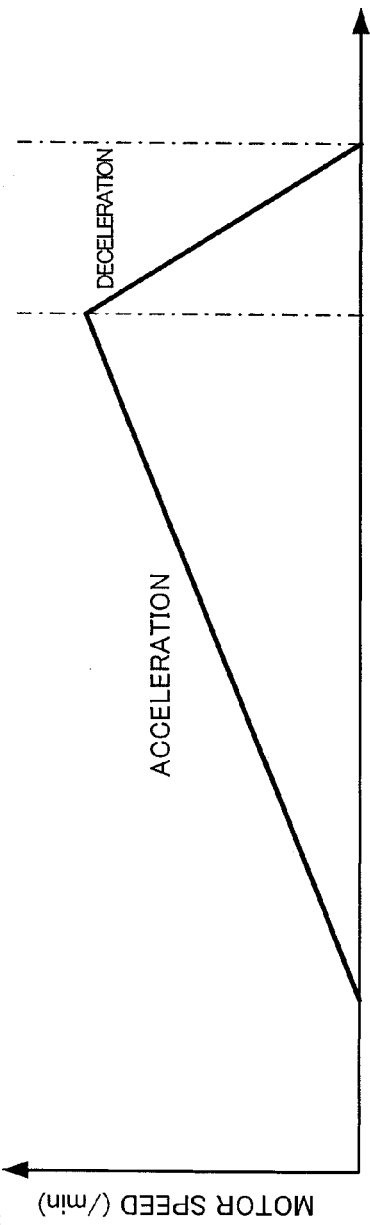
FIGS. 14a and 14b are views for describing a seventh embodiment of this invention in which discharge is completed when a capacitor voltage is decreased by discharge to a predetermined voltage or lower.
Figure 14B:
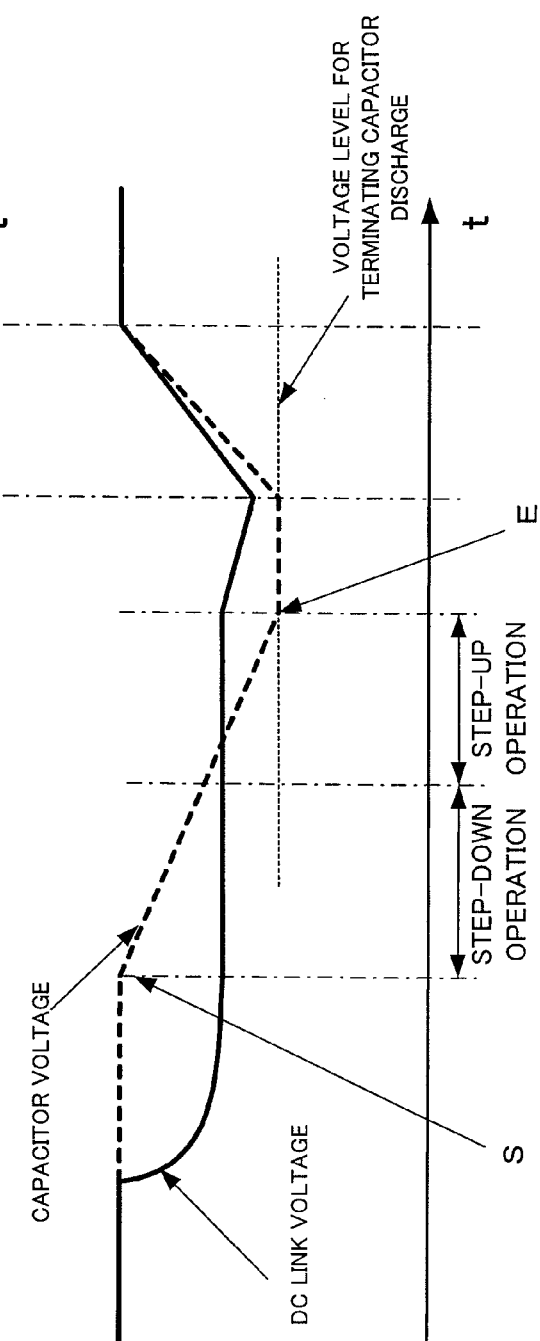

FIGS. 14a and 14b are for describing an embodiment of this invention (seventh embodiment) in which discharge is completed when the capacitor voltage is decreased by discharge to a predetermined voltage or lower.

Even if the voltage Vc of the capacitor 7 becomes lower than the DC link voltage Vdc of the DC link by the operation of the discharge control circuit 8 in FIG. 2, the capacitor 7 is able to supply electrical energy to the DC link. However, with the decrease in the voltage Vc of the capacitor 7, the supply of desired electrical energy becomes impossible, and the switching frequency of the switching elements SW1 (22), SW2 (23), and SW4 (24) of the charging/discharging control circuit 8 becomes high, resulting in a large loss in the switching elements SW1, SW2, and SW4, which causes a possibility that the temperature excessively increases. Thus, the discharge is completed. In the example in FIGS. 14a and 14b, it is indicated that the discharge of the capacitor 7 is stopped when the voltage Vc of the capacitor 7 decreases to a level for terminating the capacitor discharge, which is shown in FIG. 14b.

When the voltage Vc of the capacitor 7 decreases to a predetermined voltage during the discharge, such state may be notified to an external apparatus (eighth embodiment). As described previously, the voltage Vc of the capacitor 7 can be detected by the voltage sensor 25b. Thus, it may be arranged that a voltage signal detected by the voltage sensor 25b is displayed on a display unit, not shown. As a result, an insufficient supply of energy from the capacitor 7 is indicated, and a counter measure is taken for prevention of power voltage drop, such as stopping the operation of the machine or lowering the output of the machine. It can also easily be determined that some other counter measure such as adding the capacitance of the capacitor 7 must be taken.

FIG. 15 is for describing an embodiment of this invention (ninth embodiment) in which a predetermined voltage at which discharge is to be completed is determined by subtracting a given value from the voltage Vdc of the DC link. In FIG. 15, the predetermined voltage at which discharge of the capacitor 7 is to be completed is equal to a voltage obtained by subtracting a given value ($\Delta V$) from the DC link voltage Vdc of the DC link.

FIG. 16 is for describing an embodiment of this invention (tenth embodiment) in which a predetermined voltage at which discharge is to be completed is determined by subtracting a given value from the DC link voltage, which is obtained by subjecting input AC voltage to AC-to-DC power conversion by the converter 2.

By setting, as shown in FIG. 15 or 16, the voltage Vc at which the discharge of the capacitor 7 is to be completed, the following advantage can be attained.

An amount of current supply in the step-up operation varies depending on the DC link voltage Vdc of the DC link and the capacitor voltage Vc of the capacitor 7. Since the amount of current supply is different between ranges of power voltage, an appropriate discharge termination voltage cannot be set, if the predetermined voltage at which the discharge is to be completed is a fixed value. On the other hand, it becomes possible to obtain an appropriate discharge termination voltage, if the predetermined voltage at which discharge is to be completed is set based on values of the DC link voltage Vdc of the DC link and the voltage Vc of the capacitor 7.

Electric current (average value) supplied from the capacitor 7 can be represented by the following formula.

Supplied current(average value)=Maximum current value×[(Capacitor voltage $Vc$)/($DC$ link voltage $Vdc$ of inverter)]

Figure 17:
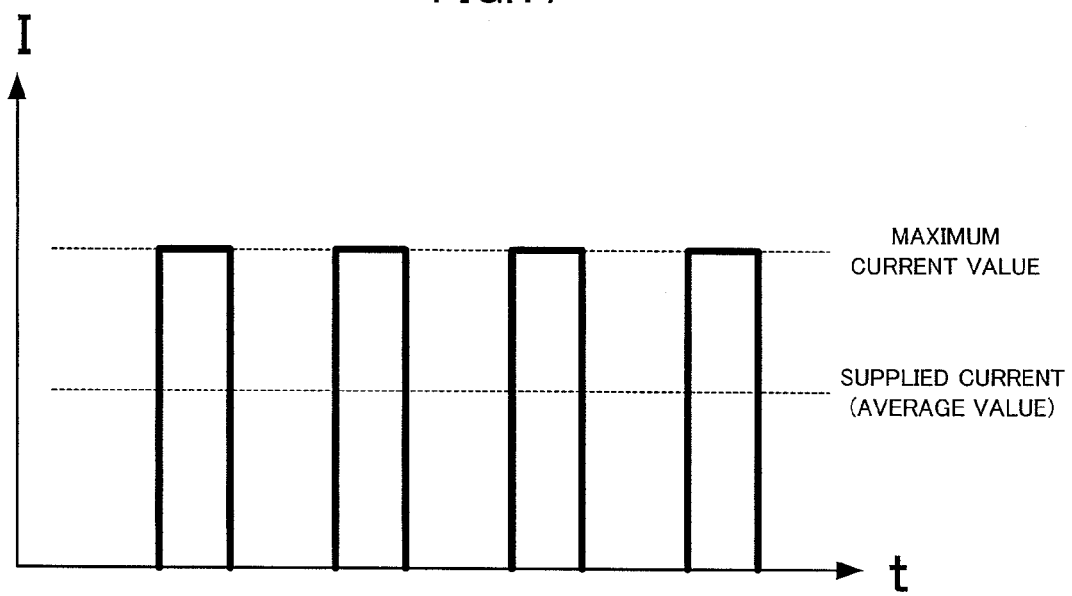
FIG. 17 is a view showing that in this invention a ratio between capacitor voltage and DC link voltage in an inverter coincides with an ON/OFF ratio of electric current supplied from a capacitor.

It should be noted that the maximum current value is a maximum value of discharge current supplied from the capacitor 7 to the DC link. A ratio between the capacitor voltage Vc of the capacitor 7 and the DC link voltage Vdc of the DC link represents an ON/OFF ratio of current (see FIG. 17).

Figure 18:
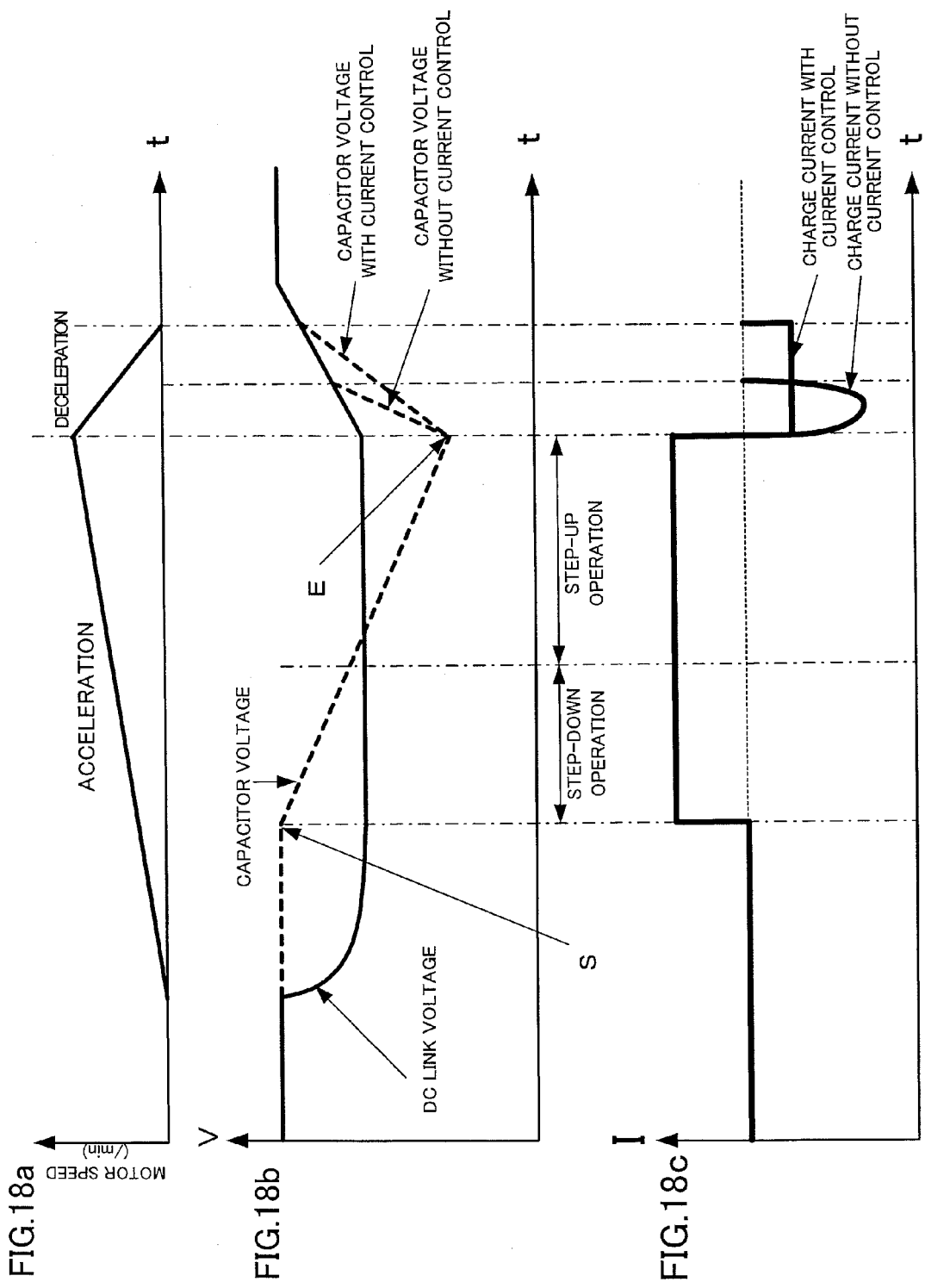
FIGS. 18a to 18c are views for describing an eleventh embodiment of this invention in which when a capacitor voltage is lower than a DC link voltage, a charge operation is performed and a charge current is limited to a predetermined value or less.

FIGS. 18a to 18c are for describing an embodiment of this invention (eleventh embodiment) in which when the voltage Vc of the capacitor 7 is lower than the DC link voltage Vdc, charge is made and charge current is limited to a predetermined value or less.

By virtue of the operation of the charging/discharging control circuit 8 in FIG. 2, the capacitor 7 is able to supply electrical energy to the DC link even when the capacitor voltage Vc becomes lower than the DC link voltage Vdc.

After completion of acceleration of the motor 4, a step-up operation is stopped, and therefore a charge current flows from the power source to the capacitor 7. At that time, if there is a large voltage difference between the power source voltage and the voltage Vdc of the capacitor 7, an excessively large current flows into the capacitor 7 to adversely affect the power source and the charging/discharging control circuit 8.

To obviate this, the capacitor 7 is charged, while the charge current is controlled such as to prevent an excessive current flow. The charge control switch SW2 (23) of the charging/discharging control circuit 8 in FIG. 2 is made ON and OFF as concrete current control means, whereby current control can be realized.

Figure 19:
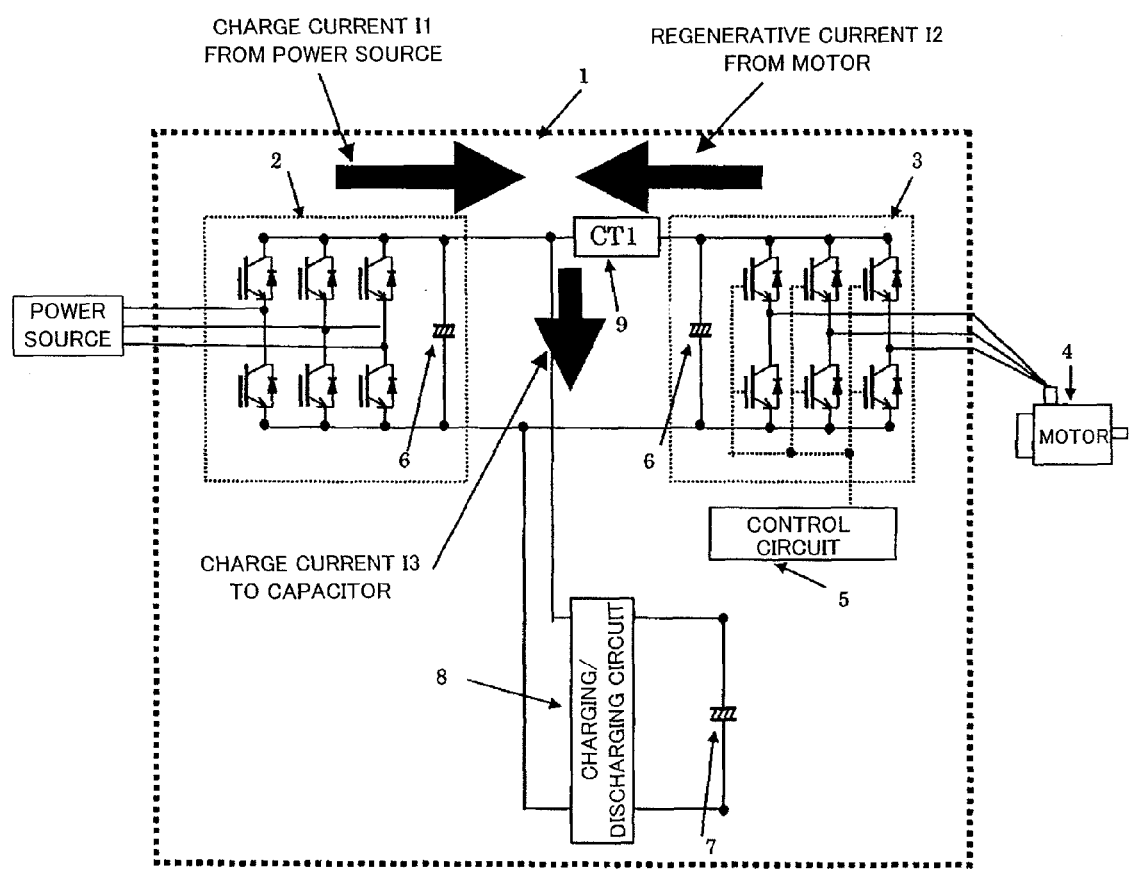
FIG. 19 is a view showing a twelfth embodiment of this invention in which the limit value of charge current supplied to a capacitor is made large when it is detected that regenerative energy (current) is generated by motor deceleration.

FIG. 19 is for describing an embodiment (twelfth embodiment) in which the generation of regenerative energy (current) by deceleration of the motor 4 is detected and a limit value of the charge current to the capacitor 7 is made large.

At completion of acceleration of the motor 4, a charge current flows from the capacitor 7 to the power supply. In that period, the motor 4 is sometimes decelerated and regenerative energy is generated. Also in that case, it is preferable that the regenerative energy produced by the motor 4 be accumulated in the capacitor 7. The electric current flowing into the capacitor is however restricted to limit the charge current from the power source. As a result, an amount of regenerative energy supplied from the motor 4 and accumulated in the capacitor 7 is also restricted.

Accordingly, regenerative current from the motor 4 is detected by the first current sensor (CT1) 9 and a limit value of the charge current to the capacitor 7 is made large when regenerative energy is generated, thus permitting regenerative energy to be accumulated in the capacitor 7 at deceleration of the motor 4.

As a result, the ability of energy saving can be improved. The generation of regenerative energy at deceleration of the motor 4 can be detected based on the direction of current flowing through the first current sensor (CT1) 9.

At deceleration of the motor 4, there are flows of current in the directions shown in FIG. 19. The limit value of current flowing to the capacitor 7 is made large according to the magnitude of regenerative current I2 flowing through the first current sensor (CT1) 9. For example, the limit value of charge current flowing to the capacitor 7 is made equal to the sum of a limit value of current input from the power supply and the regenerative current from the motor 4. As a result, a current I3, i.e., the sum of charge current I1 from the power source and regenerative current I2 from the motor 4, flows into the capacitor 7, and electrical energy is accumulated therein.

Figure 20:
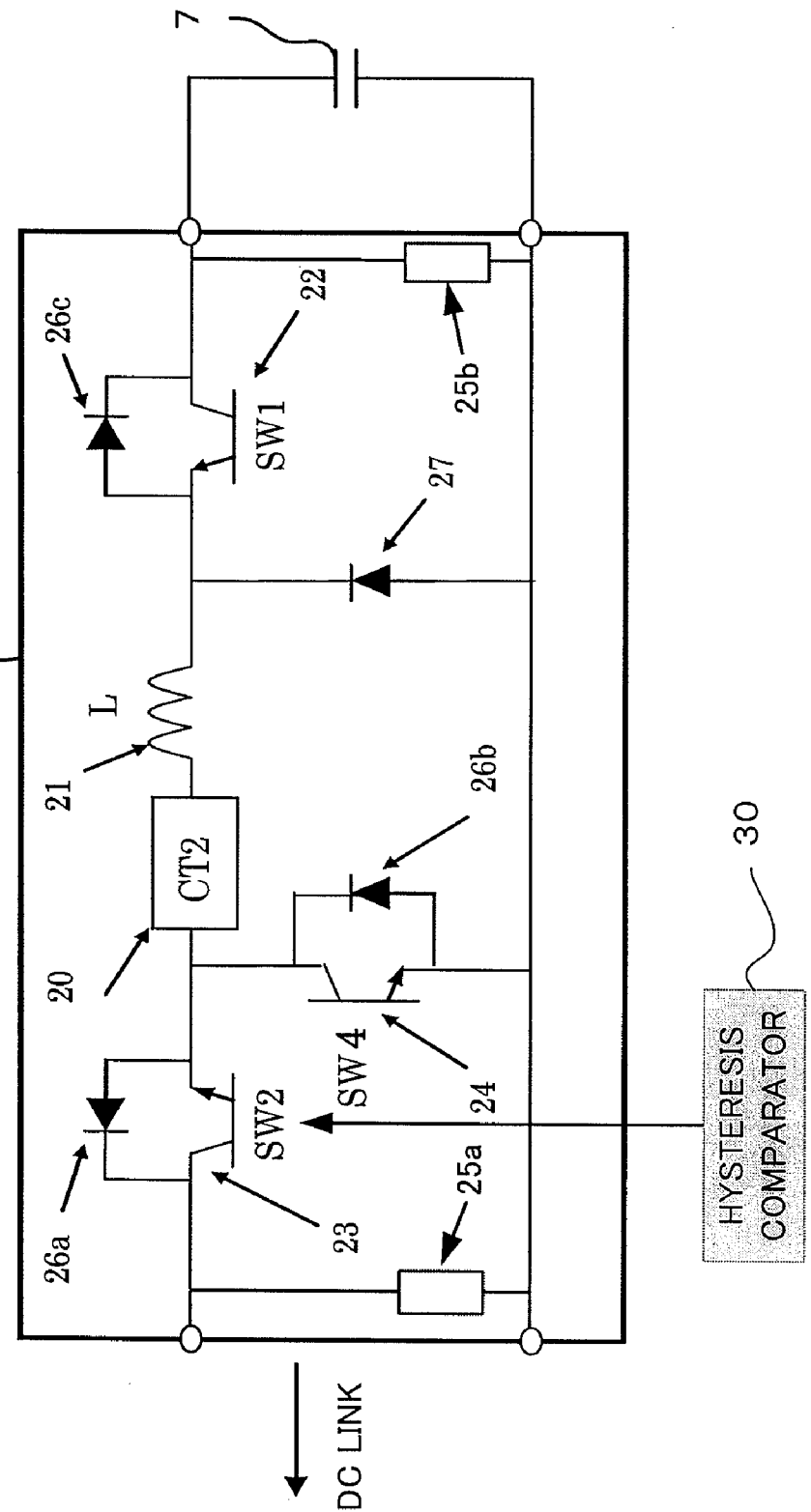
FIG. 20 is a view for describing a thirteenth embodiment of this invention in which a value of electric current flowing through a charging circuit is compared with a limit value of charge current flowing through the charging/discharging control circuit by use of a comparator with hysteresis, and a hysteresis element for controlling the current flowing through the charging/discharging control circuit is controlled in accordance with an output from the comparator, so as to limit a value of charge current flowing through the charging/discharging control circuit to the limit value.

FIG. 20 is for describing an embodiment (thirteenth embodiment) in which a comparator with hysteresis is used to compare a value of current flowing through the charge circuit with a limit value, and a switching element for controlling current flowing through the charging/discharging control circuit 8 is controlled in accordance with an output of the comparator, to limit a value of charge current flowing through the charging/discharging control circuit 8 to the limit value.

Figure 21A:
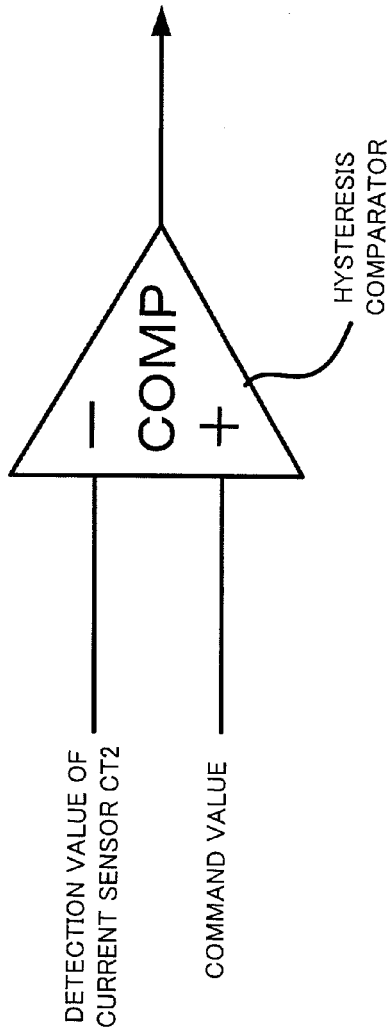
FIGS. 21a and 21b are views for describing that a value detected by a second electric current sensor (CT2) is compared with a command value by a hysteresis comparator, and the ON and OFF of SW2 is switching-controlled in accordance with a result of comparison.
Figure 21B:
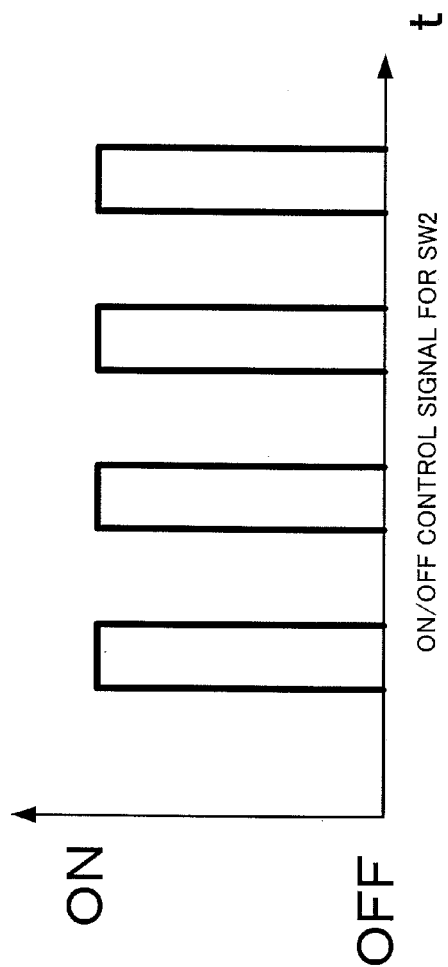

To make a current value detected by the second current sensor (CT2) 20 of the charging/discharging control circuit 8 (see FIG. 2) coincident with the limit value of charge current, the detected current value is compared with the limit value by use of a hysteresis comparator 30 (see FIGS. 21a and 21b), and the ON and OFF of the SW2 (23) is controlled in accordance with an output representing a result of comparison.

As shown in FIGS. 22a and 22b, when a value of output of the hysteresis comparator 30 that satisfies a relation of command value+a < detection value by the current sensor (CT2) is detected, the SW2 (23) is changed from H to L (from ON to OFF). When a value satisfying a relation of command value−β> detection value by the second current sensor (CT2) is detected, the SW2 (23) is changed from L to H (from OFF to ON). As a result, the current flowing through the second current sensor (CT2) follows a given command value.

Figure 23A:
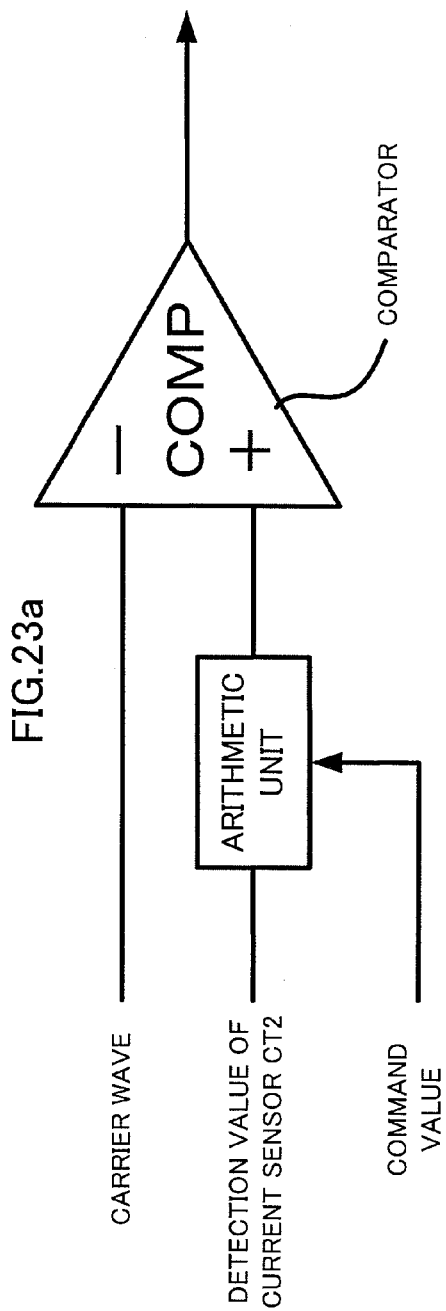
FIGS. 23a and 23b are views for describing a fourteenth embodiment of this invention in which a PWM command is produced and a switching element is controlled.
Figure 23B:

FIGS. 23a and 23b are for describing an embodiment (fourteenth embodiment) in which a PWM command is produced for use in control of a switching element. As shown in FIGS. 23a and 23b, a voltage command is determined by arithmetic operation using a command value and a current value detected by the second current sensor (CT2) 20 of the charging/discharging control circuit 8 (see FIG. 2), and the voltage command is compared with a carrier wave by a comparator, whereby a PWM command is produced. The SW2 (23) is made ON and OFF in accordance with the PWM command. As understood from in FIGS. 24a and 24b, when the current detected by the second current sensor (CT2) 20 is low, the command value becomes high and the PWM command is made ON or broad in width. Conversely, when the current detected by the second current sensor (CT2) 20 is high, the command value becomes low and the PWM command is made OFF or narrow in width. As a result, the current detected by the second current sensor (CT2) 20 follows the command value.

What is claimed is:

1. A motor controller comprising:
    a converter that converts input AC power into DC power;
    an inverter that inverts the converted DC power into AC power;
    a DC link that connects said converter and said inverter; and
    a capacitor and a charging/discharging control circuit that are connected in parallel with said DC link so that electrical energy is supplied from said DC link to said capacitor and vice versa through said charging/discharging control circuit,
    wherein said charging/discharging control circuit includes a discharge circuit that is adapted to perform a step-up operation of raising a voltage of said capacitor and a step-down operation of lowering a voltage of said capacitor while the electrical energy charged in said capacitor is discharged; and
    said motor controller further comprises first switching means that switches operations of the discharge circuit based on comparison between a voltage of said capacitor and a voltage of said DC link so that the discharge circuit performs the step-down operation when the voltage of said capacitor is higher than the voltage of said DC link, and performs the step-up operation when the voltage of said capacitor becomes lower than the voltage of said DC link.

2. A motor controller according to claim 1, further comprising second switching means that switches operations of the discharge circuit based on comparison between a voltage of said capacitor and a voltage of said DC link so that the discharge circuit performs the step-down operation when the voltage of said capacitor is higher than a sum of the voltage of said DC link and a predetermined voltage, and performs the step-up operation when the voltage of said capacitor becomes lower than the sum.

3. A motor controller according to claim 1, wherein the step-down operation is switched to the step-up operation when a discharge current flowing from said capacitor during the step-down operation decreases to a given value or less.

4. A motor controller according to claim 1, further comprising a comparator with hysteresis that compares a command value and a current flowing through said charging/discharging circuit, wherein a switching element for controlling the current flowing through said charging/discharging circuit is controlled in accordance with an output of said comparator so that the current flowing through said charging/discharging circuit follows the command value.

5. A motor controller according to claim 4, wherein the command value is corrected according to a voltage of said capacitor and a voltage of said DC link so that an average value of a current supplied from said charging/discharging circuit to said inverter during the step-up operation follows the command value.

6. A motor controller according to claim 5, wherein the command value is corrected according to an inverse ratio of the voltage of said capacitor and the voltage of said DC link.

7. A motor controller according to claim 1, wherein the discharge of the electrical energy charged in said capacitor is terminated when a voltage of said capacitor is decreased to a predetermined voltage or less.

8. A motor controller according to claim 7, further comprising notification means that notifies an external device of the decrease of the voltage of said capacitor to the predetermined voltage.

9. A motor controller according to claim 7, wherein the predetermined voltage is determined to a voltage obtained by subtracting a given value from a voltage of said DC link.

10. A motor controller according to claim 7, wherein the predetermined voltage is determined to a voltage obtained by subtracting a given value from a voltage of said DC link obtained by AC-to-DC power conversion by said converter.

11. A motor controller according to claim 1, wherein when a voltage of said capacitor is lower than a voltage of said DC link and said inverter is in a regenerative state, the electrical energy is supplied from said DC link to said capacitor to be charge while limiting a charge current into said capacitor to a predetermined value or less.

12. A motor controller according to claim 11, wherein the predetermined value for limiting the charge current is set to a sum of a limit value of current input to said converter and a regenerative current from said inverter.

13. A motor controller according to claim 1, further comprising a comparator with hysteresis that compares a value of current flowing through said charging/discharging control circuit and a limit value, wherein a switching element for controlling the current flowing through said charging/discharging control circuit is controlled in accordance with an output of said comparator so as to limit a charge current into said capacitor.

14. A motor controller according to claim 1, wherein a switching element for controlling a current flowing through said charging/discharging control circuit is controlled in accordance with a PWM command produced based on a result of an arithmetic operation using a value of the current flowing through said charging/discharging control circuit and a predetermined limit value so that a charge current into said capacitor follows the predetermined limit value.

* * * * *